US012063410B2

(12) United States Patent
Swerdlow et al.

(10) Patent No.: US 12,063,410 B2
(45) Date of Patent: Aug. 13, 2024

(54) METHODS, SYSTEMS, AND MEDIA FOR PRESENTING MEDIA CONTENT ITEMS WITH AGGREGATED TIMED REACTIONS

(71) Applicant: Google LLC, Mountain View, CA (US)

(72) Inventors: Avner Swerdlow, Atlanta, GA (US); Stephen DeSalvo, Los Angeles, CA (US); Ling Fang, Los Angeles, CA (US); Ryan Knauer, Los Angeles, CA (US); David Valleau, Los Angeles, CA (US); Derrick Treul, Los Angeles, CA (US); Murtaza Halai, Los Angeles, CA (US); Simon Han, Los Angeles, CA (US); Antonia Hidalgo, San Francisco, CA (US); Siobhan Quinn, San Francisco, CA (US); Lyric Liu, San Bruno, CA (US); Katherine Schwartz, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/082,061

(22) Filed: Dec. 15, 2022

(65) Prior Publication Data
US 2023/0308709 A1    Sep. 28, 2023

Related U.S. Application Data

(60) Provisional application No. 63/323,895, filed on Mar. 25, 2022.

(51) Int. Cl.
*H04N 21/431*    (2011.01)
*H04N 21/234*    (2011.01)
(Continued)

(52) U.S. Cl.
CPC ... *H04N 21/4316* (2013.01); *H04N 21/23418* (2013.01); *H04N 21/235* (2013.01);
(Continued)

(58) Field of Classification Search
CPC ......... H04N 21/4316; H04N 21/23418; H04N 21/235; H04N 21/472; H04N 21/8146; H04N 21/8547
See application file for complete search history.

(56) References Cited

U.S. PATENT DOCUMENTS 10,536,542 B1 *  1/2020  Dorner .................... H04L 51/52
2014/0075317 A1   3/2014  Dugan et al.
(Continued)

FOREIGN PATENT DOCUMENTS

WO    WO 2015103636    7/2015
WO    WO 2022047477    3/2022

OTHER PUBLICATIONS

International Search Report and Written Opinion dated Mar. 29, 2023 in International Patent Application No. PCT/US2022/052979.

*Primary Examiner* — Kyu Chae
(74) *Attorney, Agent, or Firm* — Shumaker & Sieffert, P.A.

(57) ABSTRACT

Methods, systems, and media for presenting media content items with aggregated timed reactions are provided. In some embodiments, a method for presenting media content items with viewer reactions includes: retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions; grouping the plurality of reactions based on the reaction timestamp and based on the selected graphical icon; identifying a plurality of key moments within the media content item based on the grouping of the plurality of reactions, wherein each of the plurality of key moments is associated with a representative graphical icon that corresponds to an
(Continued)

aggregated viewer reaction; receiving a request from a user device to present the media content item; and causing the media content item to be presented in a video window while concurrently presenting the aggregated viewer reaction within the video window when a current playback position of the media content item corresponds to a time window associated with each of the plurality of key moments.

21 Claims, 15 Drawing Sheets

(51) Int. Cl.
*H04N 21/235* (2011.01)
*H04N 21/472* (2011.01)
*H04N 21/81* (2011.01)
*H04N 21/8547* (2011.01)

(52) U.S. Cl.
CPC ....... *H04N 21/472* (2013.01); *H04N 21/8146* (2013.01); *H04N 21/8547* (2013.01)

(56) References Cited

U.S. PATENT DOCUMENTS

| | | |
|---|---|---|
| 2016/0019707 A1* | 1/2016 | Barman .............. G06F 16/4393 715/202 |
| 2017/0257410 A1 | 9/2017 | Gattis et al. |
| 2018/0331842 A1* | 11/2018 | Faulkner .................. H04N 7/15 |
| 2021/0357447 A1 | 11/2021 | McKenzie et al. |
| 2021/0400236 A1* | 12/2021 | Amiri .................... G06T 13/40 |

* cited by examiner

METHODS, SYSTEMS, AND MEDIA FOR PRESENTING MEDIA CONTENT ITEMS WITH AGGREGATED TIMED REACTIONS

CROSS-REFERENCE TO RELATED APPLICATION

This application claims the benefit of U.S. Patent Application No. 63/323,895, filed Mar. 25, 2022, which is hereby incorporated by reference herein in its entirety.

TECHNICAL FIELD

The disclosed subject matter relates to methods, systems, and media for presenting media content items with aggregated timed reactions.

BACKGROUND

Users frequently use websites associated with particular services or applications associated with particular services to view media content (e.g., stream or download media content, such as music, television shows, movies, videos, etc.), connect with other users (e.g., via social networking services), perform tasks (e.g., purchase items, edit documents, receive or send messages, etc.).

Such services often include sections for viewers to react to media content being consumed. For example, a content creator that has uploaded a video to a media sharing service can allow viewers to "like" or "dislike" the video, where the total number of "like" reactions (e.g., a thumbs up) and "dislike" reactions (e.g., a thumbs down) can be presented in a static region of the video window along with the video. Such like and dislike reactions to an entire video, however, are neither expressive nor meaningful enough reactions to the video. For example, a viewer can only react to the video as a whole even when the viewer may have different emotions or feelings throughout the duration of the video. As such, there is a need to enhance the range and frequency of electronic communications by improving the communication of viewer reactions and emotions, electronically, between the content creator and the viewers.

Additionally, viewers can submit a comment to include their attitudes or thoughts about the video being consumed. In some instances, a viewer can comment on a specific moment in the video by adding a timestamp of that moment in their comment. In order for a viewer to submit a comment or read comments submitted by others in the audience, however, the viewer typically has to scroll away or otherwise divert their attention away from the video player while the video continues to be played back.

Accordingly, it is desirable to provide new mechanisms for presenting media content items with aggregated timed reactions.

SUMMARY

In accordance with some embodiments of the disclosed subject matter, methods, systems, and media for presenting media content items with aggregated timed reactions are provided.

In accordance with some embodiments of the disclosed subject matter, a method for presenting media content items with viewer reactions is provided, the method comprising: retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions; grouping the plurality of reactions based on the reaction timestamp and based on the selected graphical icon; identifying a plurality of key moments within the media content item based on the grouping of the plurality of reactions, wherein each of the plurality of key moments is associated with a representative graphical icon that corresponds to an aggregated viewer reaction; receiving a request from a user device to present the media content item; and causing the media content item to be presented in a video window while concurrently presenting the aggregated viewer reaction within the video window when a current playback position of the media content item corresponds to a time window associated with each of the plurality of key moments.

In some embodiments, the plurality of reactions associated with the media content item are retrieved from a reactions database in response to determining that a number of the plurality of reactions is greater than a threshold value.

In some embodiments, the method further comprises transmitting a query to a reactions database that requests a count of received reactions for the media content item from a given timestamp, where the plurality of reactions associated with the media content item are retrieved based on the count included in a response to the query.

In some embodiments, the method further comprises determining whether the media content item is eligible for identifying the plurality of key moments prior to retrieving the plurality of reactions associated with the media content item.

In some embodiments, the plurality of key moments within the media content item are identified by: generating a histogram of each received reaction over time, where each reaction is placed within a bucket of the histogram; and detecting an expanding mound in the generated histogram as one of the plurality of key moments in the media content item.

In some embodiments, a first expanding mound in the generated histogram is associated with a first time interval and a second expanding mound in the generated histogram is associated with a second time interval, and the first expanding mount is combined with the second expanding mount in response to the first time interval and the second time interval being separated by less than a threshold time.

In some embodiments, grouping the plurality of reactions further comprises removing a subset of reactions associated with a first timestamp from the plurality of reactions in response to determining that a number of reactions in the subset of reactions is less than a threshold value.

In some embodiments, a key moment from the plurality of key moments is identified in response to determining that a number of reactions associated with the key moment is greater than a threshold value, where the representative graphical icon associated with the key moment corresponds with the graphical icon that was most frequently selected by viewers of the media content item.

In some embodiments, the method further comprises causing a reaction panel interface to be presented during the presentation of the media content item in the video window, where the reaction panel interface includes a plurality of selectable graphical icons that each correspond to one of the plurality of reactions.

In some embodiments, in response to receiving a user selection of the graphical icon from the plurality of selectable graphical icons in the reaction panel interface, the graphical icon is presented above a playhead in a progress bar of the video window.

In some embodiments, the method further comprises determining whether the graphical icon that was received at a first time matches the representative graphical icon associated with a moment at the first time, where the graphical icon that is presented above the playhead in the progress bar of the video window is enhanced based on the determination.

In some embodiments, the reaction panel interface has a collapsed state that includes a single graphical icon.

In some embodiments, the reaction panel interface transitions from the collapsed state to an expanded state in response to receiving a user selection of the single graphical icon.

In some embodiments, the single graphical icon transitions between a first representative graphical icon to a second representative graphical icon in response to the playback position of the media content item reaching each of the plurality of key moments, where the first representative graphical icon is associated with a first key moment and the second representative graphical icon is associated with a second key moment.

In some embodiments, the aggregate viewer reaction is presented concurrently with the media content item by presenting a graphical representation of the aggregate viewer reaction above a playhead in a progress bar of the video window.

In some embodiments, the graphical representation is an animation that includes multiple graphical icons corresponding to the aggregate viewer reaction and that shows the multiple graphical icons flowing from the playhead in the progress bar of the video window and into the video window.

In some embodiments, the graphical representation is an animation that indicates the aggregate viewer reaction and indicates an intensity of the aggregate viewer reaction, where the intensity is based on a number of received reactions at one of the plurality of key moments.

In some embodiments, the graphical representation ceases from being presented in response to determining that the current playback position of the media content item does not correspond to the time window associated with one of the plurality of key moments.

In some embodiments, the reaction panel interface has an expanded state that includes a plurality of selectable graphical icons that each correspond to one of the plurality of reactions and the concurrent presentation of the media content item in the video window with the aggregated viewer reaction is activated in response to the reaction panel interface being in the expanded state.

In accordance with some embodiments of the disclosed subject matter, a system for presenting media content items with viewer reactions is provided, the system comprising a hardware processor that is configured to: retrieve a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions; group the plurality of reactions based on the reaction timestamp and based on the selected graphical icon; identify a plurality of key moments within the media content item based on the grouping of the plurality of reactions, wherein each of the plurality of key moments is associated with a representative graphical icon that corresponds to an aggregated viewer reaction; receive a request from a user device to present the media content item; and cause the media content item to be presented in a video window while concurrently presenting the aggregated viewer reaction within the video window when a current playback position of the media content item corresponds to a time window associated with each of the plurality of key moments.

In accordance with some embodiments of the disclosed subject matter, a non-transitory computer-readable medium containing computer executable instructions that, when executed by a processor, cause the processor to execute a method for presenting media content items with viewer reactions is provided, the method comprising: retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions; grouping the plurality of reactions based on the reaction timestamp and based on the selected graphical icon; identifying a plurality of key moments within the media content item based on the grouping of the plurality of reactions, wherein each of the plurality of key moments is associated with a representative graphical icon that corresponds to an aggregated viewer reaction; receiving a request from a user device to present the media content item; and causing the media content item to be presented in a video window while concurrently presenting the aggregated viewer reaction within the video window when a current playback position of the media content item corresponds to a time window associated with each of the plurality of key moments.

In accordance with some embodiments of the disclosed subject matter, a system for presenting media content items with viewer reactions is provided, the system comprising: means for retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions; means for grouping the plurality of reactions based on the reaction timestamp and based on the selected graphical icon; means for identifying a plurality of key moments within the media content item based on the grouping of the plurality of reactions, wherein each of the plurality of key moments is associated with a representative graphical icon that corresponds to an aggregated viewer reaction; means for receiving a request from a user device to present the media content item; and means for causing the media content item to be presented in a video window while concurrently presenting the aggregated viewer reaction within the video window when a current playback position of the media content item corresponds to a time window associated with each of the plurality of key moments.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
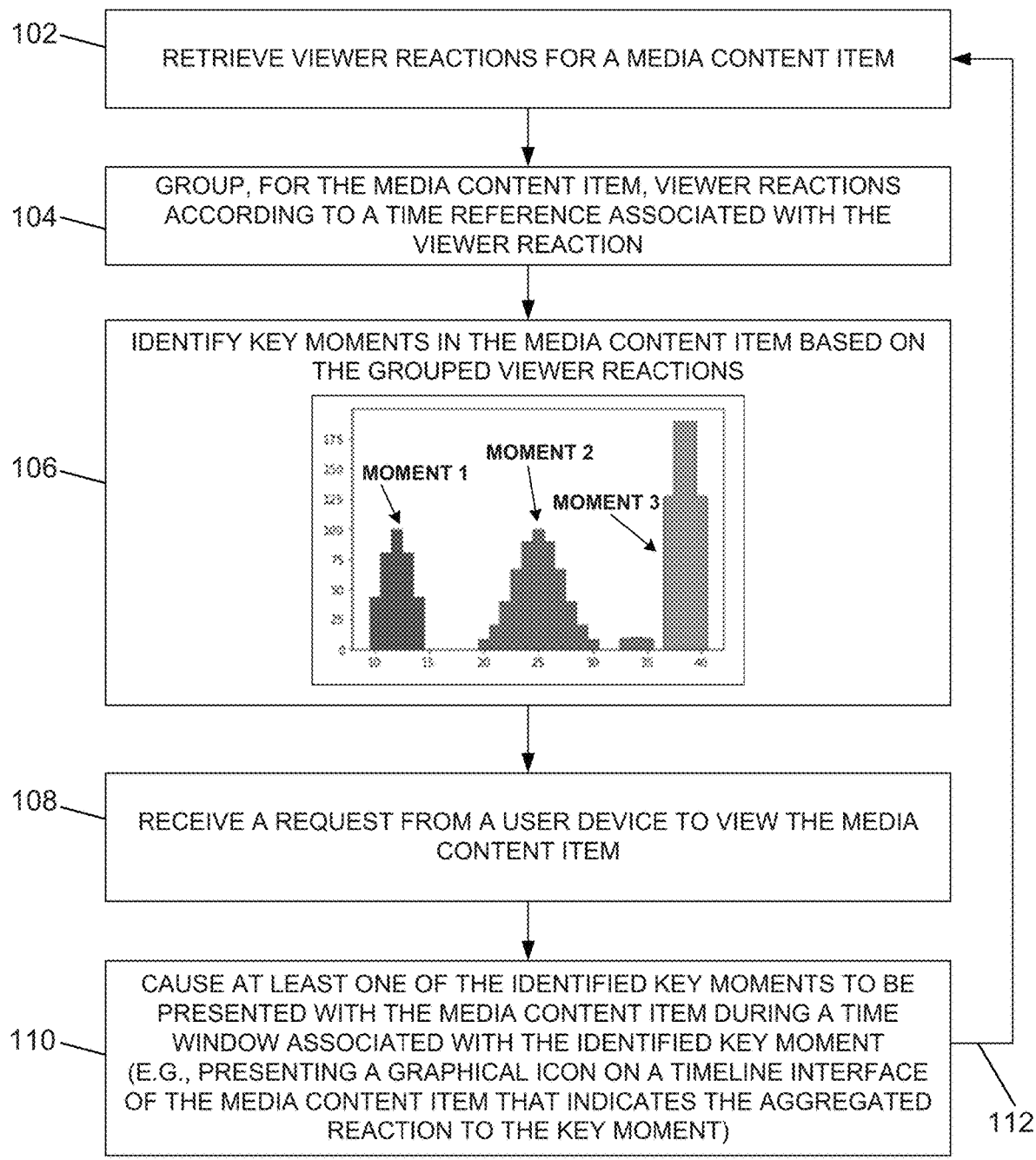
FIG. 1 shows an example flow diagram of a process for identifying moments in a media content item based on aggregated viewer reactions in accordance with some embodiments of the disclosed subject matter.

In accordance with various embodiments of the disclosed subject matter, mechanisms (which can include methods, systems, and media) for presenting media content items with aggregated timed reactions are provided.

Generally speaking, the mechanisms described herein can present reaction panel interfaces that allow viewers to provide a reaction to a particular portion of a media content item and can identify key moments within a media content item based on the received reactions. In addition, the mechanisms described herein can present audience icons or any other suitable graphical icon, reaction graphic, and/or reaction animation to indicate the popular reaction or sentiment at identified key moments concurrently with the presentation of the media content item, when the playback position of the media content item corresponds with a time interval associated with one of the identified key moments.

In some embodiments, the mechanisms described herein can present reaction panel interfaces within a video player application or any other suitable media application, where the reaction panel interfaces can allow the viewer of a media content item to select a reaction to a particular moment of the media content item. The reaction can be submitted by selecting a graphical icon (e.g., an emoticon or an emoji) from a menu of graphical icons at a particular playback position while the video content item is being played back. These reaction panel interfaces can, for example, provide viewers with a mechanism to react to a particular moment within the media content item without drawing the viewer's attention away from the media content item.

In some embodiments, the reaction panel interface can have a collapsed state in which a reduced number of graphical icons (such as a single graphical icon) are presented to the viewer for selection and an expanded state in which a full set of graphical icons (such as a set of five graphical icons) are presented to the viewer for selection. In such an embodiment, in response to receiving a particular user input (e.g. a long press on a touch-sensitive display at a region that corresponds to the collapsed reaction panel interface), the reaction panel interface can transition from a collapsed state to an expanded state. Alternatively, in response to receiving another particular user input (e.g., a short press on a touch-sensitive display at a region that corresponds to the collapsed reaction panel interface), the reaction panel interface can cause the graphical icon displayed on the collapsed reaction panel interface to be submitted as a reaction to the particular moment in the media content item. It should be noted that, in some embodiments, the graphical icon displayed on the collapsed reaction panel interface can be modified to a representative graphical icon in response to reaching a key moment within the media content item. It should also be noted that, in some embodiments, the synchronous presentation of aggregated timed reactions at key moments can be activated in the video window based on the status of the reaction panel interface (e.g., feature activation when the reaction panel is expanded).

In some embodiments, the graphical icon that was selected by the viewer from the reaction panel interface can be presented within the video window that is currently presenting the media content item. For example, an animation that includes the graphical icon that was selected by the viewer from the reaction panel interface can be presented above the playhead of the progress bar in the video window. This animation or any other suitable graphic can represent the incoming stream of reactions and can, for example, provide viewers of the media content item with an understanding of how other viewers feel about moments within the media content item.

In some embodiments, the mechanisms described herein can use the received reactions that were submitted using the reaction panel interfaces to identify key moments within the media content item. For example, the mechanisms can determine a subset of reactions from the retrieved reactions that occur within the same portion of the media content item. In another example, the mechanisms can determine that the number of reactions at a particular time point is above a threshold value and can group the reactions into a key moment. In yet another example, the mechanisms can generate one or more histograms that group the received reactions into bins based on a time that the reaction was received and the type of reaction that was received (e.g., a "heart" emoji) and can detect the presence of key moments within the media content item based on an analysis of features in the histogram. In continuing this example, the time interval corresponding to a particular feature in the histogram can be associated with the identified key moment—e.g., 500 viewers loved the moment between 1:25 and 1:30 in the media content item. Each key moment can be associated with a representative graphical icon. For example, in the above-mentioned example, a "heart" emoji can be associated with the particular key moment that occurs between 1:25 and 1:30 in the media content item as it represents the popular sentiment at that moment in the media content item.

In some embodiments, the representative graphical icon or any other suitable graphic that represents the popular sentiment at a key moment in the media content item can be synchronously presented during the presentation of the media content item. For example, during the presentation of the media content item, the representative graphical icon or any other suitable graphic can be presented above the playhead of the progress bar in the video when the current playback position matches the time interval of a key moment to indicate the popular sentiment from the received reactions at that key moment in the media content item. In another example, key moments and their corresponding representative graphical icon can be presented along a timeline interface of the media content item. This can, for example, provide viewers of the media content item with an understanding of how other viewers feel about that moment within the media content item.

In some embodiments, different representative graphical icons or graphics can be presented based on the intensity or magnitude of the aggregated viewer reaction at that moment. For example, in response to receiving a relatively large number of reactions at a key moment, the mechanisms can select a representative graphical icon that indicates the relative intensity of the reaction (e.g., a fountain animation of multiple "heart" icons flowing from the playhead in the progress bar). In another example, in response to receiving a relatively large number of reactions at a key moment, the mechanisms can select an animation of graphical icons, where the graphical icons appear in proportion to the number of received reactions.

In some embodiments, the mechanisms described herein can also provide features for content creators. For example, in some embodiments, the content creator can be provided with an interface that shows the identified key moments and associated key moment information for one or more media content items that were uploaded by the content creator. Key moment information can include, for example, a thumbnail image extracted from the relevant portion of the media content, a time interval that corresponds to the key moment, one or more reactions that were received at the key moment (e.g., the most popular reaction, the top three reactions, etc.), one or more graphical icons that were selected from the reaction panel interface at the key moment, etc. This can, for example, provide content creators with an understanding of how an audience feels about different moments within the media content item and/or with an understanding of which moments within the media content item that the audience provided the most reactions or engagement.

In some embodiments, the interface presented to the content creator can provide the content creator with an opportunity to respond to an aggregated timed reaction at the identified key moment within the media content item. For example, the content creator can select a key moment to provide a response to the viewer reaction to the key moment. Such a response from the content creator can be presented to viewers of the media content item. For example, the response can be incorporated adjacent to the representative graphical icon in a comments panel, a live chat interface, or any other suitable portion of the video player application. This can, for example, provide an interaction mechanism between the content creator and viewers.

These and other features for presenting media content items with aggregated timed reactions are described further in connection with FIGS. 1-10.

Turning to FIG. 1, an example flow diagram of a process 100 for identifying moments in a media content item based on aggregated viewer reactions is provided in accordance with some embodiments of the disclosed subject matter. In some embodiments, blocks of process 100 can be executed by any suitable device. For example, in some embodiments, blocks of process 100 can be executed by a server, such as a server that hosts one of more media content items and streams media content items to user devices.

It should be noted that process 100 can be executed at any suitable time. For example, in some embodiments, process 100 can be executed by a server that hosts one or more media content items and streams media content items to user devices in response to receiving a request from a user to play a media content item. In another example, in some embodiments, process 100 can be executed periodically in connection with any suitable indexing service that indexes and/or compiles statistical data (e.g., view counts, likes or any other suitable endorsements, reactions, new and/or revised comments, etc.) associated with media content items. In yet another example, in some embodiments, process 100 can be executed when process 100 (or any other suitable mechanism) detects a new reaction associated with a given media content item. In a further example, in some embodiments, process 100 can be executed in response to transmitting a request to a server that requests counts for any videos which have received an engagement since a given timestamp.

In some embodiments, process 100 can begin, at 102, by retrieving reactions associated with a media content item using any suitable technique or combination of techniques. In some embodiments, as discussed below in connection with FIGS. 3-5, reactions can be an expression from a viewer that indicates the viewer's feeling(s) at a particular portion of the media content item. For example, in some embodiments, a reaction can be received when a viewer selects a graphical icon (e.g., an emoticon or an emoji) from a menu of graphical icons at a particular timestamp while a video content item is being played back.

It should be noted that, although the embodiments described herein generally relate to determining reactions that were received using a reaction panel interface, this is merely illustrative and reactions can be retrieved from any suitable source. For example, a server device can obtain comment data associated with the media content item and extract reactions from each comment in the comment data. In a more particular example, a comment received from a user can include textual content, graphical content, a time reference, etc., where a reaction can be extract from the textual content (e.g., the message includes the term "loved"), from the graphical content (e.g., the message includes a "heart" emoji), etc.

In some embodiments, reactions that are associated with a media content item (e.g., a video that has been uploaded to a media sharing service) can be received at a server device (e.g., server device 902 as described in connection with FIG. 9) when submitted by a user of a user device (e.g., user device 904 as described in connection with FIG. 9). These reactions and other timed engagements from viewers can be processed and stored. In such an example, process 100 can access, request, and/or retrieve the reactions from the server device.

In a more particular example, in response to transmitting a request that includes a media content identifier that identifies the media content item or a portion of the media content item, the server device can access reactions and associated reaction information from a reactions database. The reaction information from the reactions database can include a reaction identifier that identifies the reaction; a reaction timestamp that identifies the timestamp that the reaction was received from a viewer, a frame number that identifies the frame that the reaction was received from a viewer, and/or any other suitable reference to a time point within the media content item when the reaction was received from a viewer; a user identifier that identifies a user account associated with a user or a group of users that provided the reaction, a creation timestamp that indicates the time when the reaction was created, a media content identifier that identifies the media content item or a portion of the media content item relating to the reaction, etc. As another example, reactions can be included in the metadata associated with the media content item. In such an example, process 100 can access, request, and/or retrieve the reactions associated with the media content item concurrently with the metadata associated with the media content item (e.g., the title of the media content item, a description of the media content item, the content creator of the media content item, etc.). As mentioned above, in some embodiments, process 100 can be executed in response to determining, from the reactions database, that the number of received reactions for a video content item is greater than a threshold value (e.g., more than ten total reactions, more than ten reactions in the last 24 hours, more than a particular percentage increase in received reactions, etc.).

It should be noted that, in some embodiments, prior to executing process 100 or subsequent to determining reaction information from a reactions database at 102, the server can determine whether the video content item is too risky to be eligible for identifying key moments in the media content item. For example, in response to determining that a given video content item has received more than a threshold number of reactions over a particular period of time, process 100 can determine a risk rating associated with the video content item. In a more particular example, the video content item can be input into one or more risk classifiers that determine (i) whether the video content item is present on a block list, (ii) whether the video content item is associated with a channel identifier or a user identifier that is present on a block list, (iii) whether the video content item is associated with particular content types (e.g., news content), (iv) whether the video content item is associated with topics or other entities that are deemed sensitive or objectionable (e.g., violent content, objectionable language, hate speech, adult content, and/or any other suitable type of objectionable content), etc. In continuing with this example, in response to determining that the one or more risk classifiers have deemed the video content item as having a risk rating greater than a particular threshold value (e.g., a high risk video content item based on the video content item being associated with a news content type), process 100 can end in which key moments are not to be identified for the video content item associated with the high risk rating. Alternatively, process 100 can determine that the video content item is eligible for identifying key moments within the video content item based on viewer reactions that were received during the presentation of the video content item.

In some embodiments, process 100 can, at 104, group, sort, and/or aggregate the reactions according to the reaction timestamp or any other suitable time reference that connects the reaction received from the viewer and the portion of the media content item being presented when the reaction was received. For example, in some embodiments, during the presentation of a media content item, a viewer reaction can be received when the media content item is at a time position of 0:25 (twenty-five seconds) from the starting position of the media content item and the reaction can be a "heart" emoji or graphical icon, which the viewer selected from a menu of graphical icons as discussed below in connection with FIGS. 2 and 4A-5. In continuing this example, the viewer reactions that were received during the presentation of the media content item can be grouped (for example, aggregating the number of "heart" emojis received at or around 0:25 seconds from the start of the media content item and aggregating the number of "smiley faced" emojis received at or around 0:25 seconds from the start of the media content item). In another example, some embodiments, process 100 can use a frame number or any other time reference to group the received reactions. In some embodiments, process 100 can create a group of user reactions for reactions that occur at the same timestamp and/or frame number.

In some embodiments, process 100 can, at 106, determine that a particular number of reactions has been received at a particular timestamp and/or time window (e.g., a duration of time with a starting timestamp and ending timestamp, a duration of time with a starting frame number and an ending frame number). For example, process 100 can determine that greater than a threshold number of reactions (e.g., 10 reactions) has been received at a particular time position within the media content item.

It should be noted that the threshold number can be any suitable value. For example, the server can continue to detect whether a key moment has occurred within the media content item based on the time position or time window of the media content item being associated with more than a threshold number of received reactions. In another example, the server can determine that an average number of reactions that are received for media content items uploaded by a particular content creator and can continue to detect whether a key moment has occurred within the media content item based on the time position or time window of the media content item being associated with more than the average number of reactions that are received for media content items uploaded by a particular content creator. In yet another example, the server can continue to detect whether a key moment has occurred within the media content item in response to determining that at least 10 reactions were received at a given time position or time window of the media content item and in response to determining that the number of received reactions at that given time position is greater than 1 percent of the total number of received reactions for the media content item. In a further example, the server can change threshold values based on network traffic, time of day, and/or any other suitable criterion.

In some embodiments, in response to determining that a particular time position within the media content item contains a number of reactions that is greater than the threshold value, process 100 can assign the time window to be a key moment within the media content item. It should be noted that a key moment can be associated with a single time position within the media content item, a time window within the media content item, a single frame of the media content item, a subset of frames of the media content item, a chapter of the media content item, etc. In some embodiments, process 100 can identify multiple key moments in the media content item in response to determining that multiple different time windows contain a number of reactions within the time window that are greater than the threshold value of reactions. For example, in some embodiments, a media content item can be five minutes in length and process 100 can identify five such key moments within the media content item.

Additionally or alternatively to identifying key moments in a media content item by determining time positions within the media content item in which the number of viewer reactions is greater than a threshold value, key moments can be identified by analyzing the distribution of viewer reactions over the length of the media content item. For example, upon generating a distribution of viewer reactions that were received during the presentation of the media content item over playback positions of the media content item, process 100 can extract pattern features from the distribution and identify key moments based on the extracted pattern features. In a more particular example, process 100 can determine whether there are statistically significant deviations from a normal distribution, where a significantly significant deviation can include a sharp increase in the number of received reactions over a short duration of time. In another more particular example, process 100 can determine whether there are statistically significant deviations from a normal distribution, where a significantly significant deviation can include an increase in the number of received reactions over a first duration of time followed by a significantly smaller number of received reactions over a second duration of time. It should be noted that, by analyzing the distribution of viewer reactions and/or engagements, a different number of key moments can be identified as opposed to determining key moments based on threshold values.

In some embodiments, key moments in a media content item can be identified using a water filling algorithm to determine how to group together reactions or engagements. For example, process 100 can use a water filling algorithm on the received reactions to generate a histogram with the histogram dividing the received reactions into a set of buckets having a particular bucket size. In a more particular example, with a minimum bucket size of 1 second, a histogram can be generated for a media content item in which the timestamp associated with each received reaction can be used to place a received reaction into one of the buckets. In another more particular example, the generated histogram can be multiple histograms (e.g., multiple overlapping histograms) in which each histogram can represent the distribution of a selected graphical icon that was received over the presentation of the media content item (e.g., a heart emoji histogram, a crying emoji histogram, and a histogram of all received reactions).

The water filling algorithm or any other suitable approach for generating a histogram of the reaction received by a media content item can detect the presence of one or more expanding mounds within the histogram, where a local minimum can be reached on either side of an expanding mound. In continuing this example, an expanding mound in the histogram having more than a particular number of received reactions can be deemed as key moment in the media content item, where the time interval corresponding to the expanding mound can be associated with a key moment (e.g., time interval=[35, 40]. Alternatively, a certain number of mounds within the histogram can be deemed as key moments in the media content item (e.g., the three largest mounds).

It should be noted that, in embodiments where two mounds in the above-mentioned histogram are overlapping or within a particular time threshold (e.g., separated by a 1 second interval), the two mounds can be combined to create a single, contiguous mound. Alternatively, when two mounds intersect leaving a trough between them, two distinct moments can be defined.

Accordingly, the histograms can be used to determine moment intervals from the received reactions associated with the media content item. For example, process 100 can analyze the histogram to determine that the media content item contains three key moments having moment intervals of [23, 30], [043, 46], and [84, 86] in the interval [0, 100].

It should be noted that, in some embodiments, a minimum threshold can be applied to the received reactions. This can, for example, filter out baseline noise. In a more particular example, due to the noisiness of the reactions data, a minimum number of reactions within a given second can be defined (e.g., at least two reactions within a given second of the video) in which times in the histogram having less than the minimum number of reactions within a given second can be zeroed or otherwise removed from the histogram. In another more particular example, a minimum percentage of the total number of received reactions can be defined (e.g., 1 percent of the total number of received reactions) in which buckets having less than the minimum percentage of the total number of received reactions can be zeroed or otherwise removed from the histogram.

It should also be noted that, in connection with the above-mentioned histogram, process 100 can set the smallest number of reactions or engagements per bucket (min counts per bucket) in order to continue identifying key moments in the media content item. In some embodiments, process 100 can also set the smallest number of total reactions or engagements within a media content item (min total engagement count) in order to continue identifying key moments in the media content item.

In some embodiments, the group of received reactions in the identified key moment can be associated with the same graphical icon (e.g., a heart emoji, a smiley face graphical icon, etc.). For example, at the time position of 1 minute and 25 seconds of a media content item, the server received 30 viewer reactions, which were each a heart emoji. In response, process 100 can associate the key moment with the heart emoji as being the representative graphical icon.

Alternatively, in some embodiments, the group of received reactions in the identified key moment can be associated with multiple graphical icons (e.g., a mixture of reactions that are associated with heart emojis and reactions that are associated with smiley face graphical icons). In continuing this example in which multiple graphical icons are associated with the key moment, process 100 can select the most common graphical icon as the key moment graphical icon to represent the key moment. For example, in some embodiments, process 100 can determine that 3,300 reactions have been received within a 5-second (five second)

time window of the media content item. Continuing this example, process 100 can determine that approximately 3,000 of the received reactions contained a "heart" emoji as the graphical icon and approximately 300 of the received reactions contained a "surprised face" emoji as the graphical icon. In this example, process 100 can identify the key moment as the five-second time window and can associate the "heart" emoji with the key moment as the representative graphical icon of the key moment.

Additionally or alternatively, process 100 can associate all reaction icons occurring within the time window of the key moment to the key moment.

In some embodiments, in response to identifying key moments within a media content item based on the aggregated viewer reactions and/or viewer engagements, the server can associate the media content item with each identified key moment and the associated graphical icon or icons received at the identified key moment. For example, in response to identifying key moments within a media content item based on the aggregated viewer reactions and/or viewer engagements, the server can generate an index, where a row of the index includes a media identifier corresponding to the media content item, a creator identifier corresponding to a user account of the content creator that uploaded the media content item, a moment identifier corresponding to the identified key moment, a time reference associated with the identified key moment, a representative graphical icon associated with the identified key moment (e.g., the most popular emoji selected by viewers at the time reference associated with the identified key moment), a total number of reactions received at the time reference associated with the identified key moment (e.g., 3,000 "heart" emojis), a total number of each reaction received at the time reference associated with the identified key moment (e.g., 3,000 "heart" emojis, 10 "smiley face" emojis, and 5 "thumbs up" emojis), etc.

Figure 2:
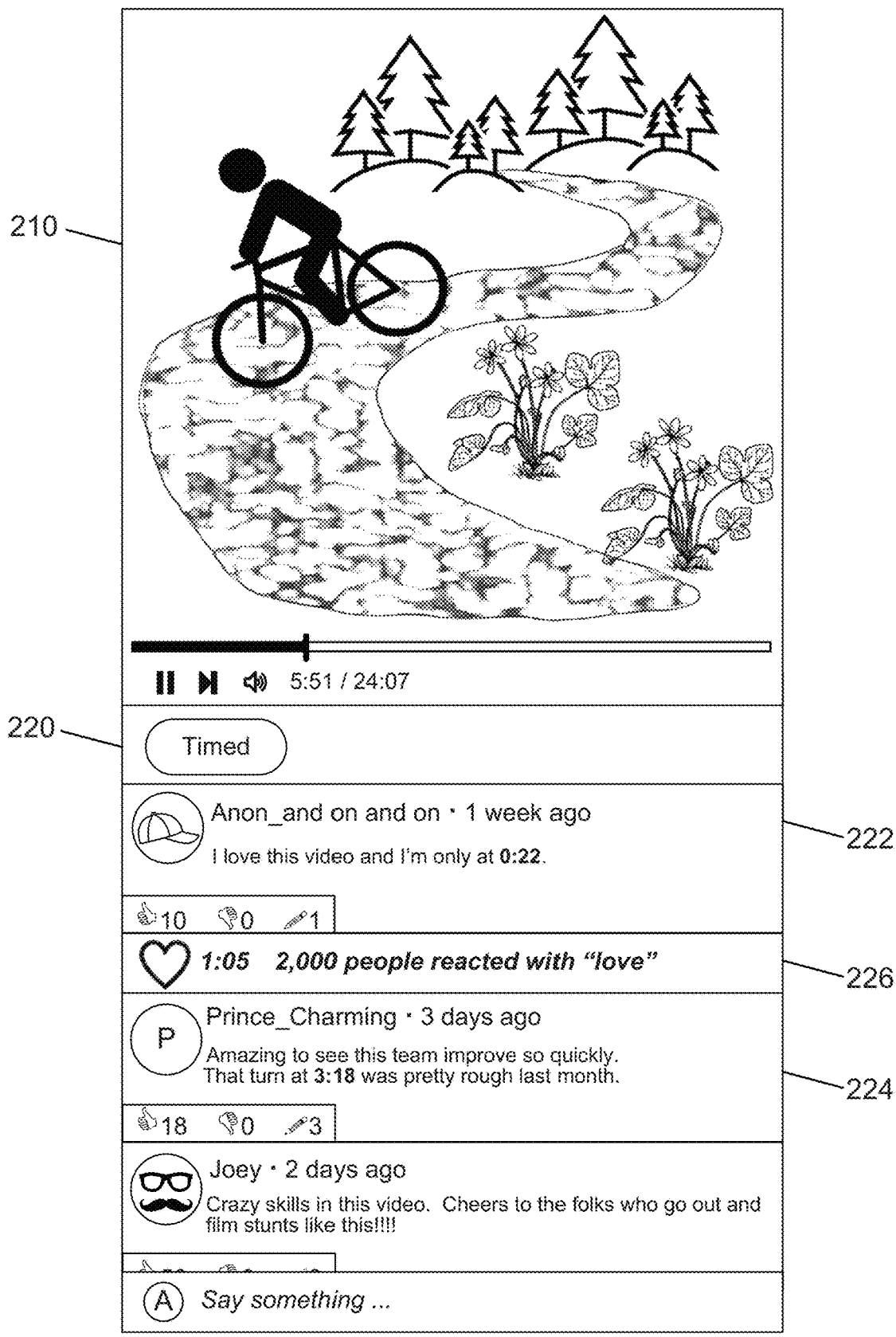
FIG. 2 shows an illustrative example of a video window that includes a video being played back, a timeline interface that indicates a particular position of the video, and a comments interface that presents comments and/or reactions associated with the video in accordance with some embodiments of the disclosed subject matter.

In response to receiving a request from a user device to view the media content item (e.g., a content creator that is accessing a dashboard interface relating to the media content item, a viewer that has requested that the server begin playing back the media content item, etc.) at 108, process 100 can cause the identified key moments to be presented in connection with the media content item. In particular, the identified key moment and/or the representative graphical icon of the key moment can be retrieved from the above-mentioned index and presented during the presentation of the media content item at the particular time window of the key moment. For example, as shown in FIG. 2, the representative graphical icon or other reaction information can be presented in a comment interface that is displayed concurrently with the presentation of the media content item. In another example, the representative graphical icon or other selected reaction can be presented in a timeline interface that is displayed concurrently with the presentation of the media content item to highlight the association of the received reactions and the particular time window at which the reactions were received.

FIG. 2 shows an illustrative example 200 of a video window that includes a video being played back, a timeline interface that indicates a particular position of the video, and a comments interface that presents comments and/or reactions associated with the video in accordance with some embodiments of the disclosed subject matter.

It should be noted that, although the embodiments described herein generally present aggregated timed reactions during the presentation of a pre-recorded video that has been uploaded to a media sharing platform, this is merely illustrative. Aggregated timed reactions or other aggregated timed engagements can be presented concurrently with any suitable media content item, such as live streamed video content, audio content, textual content, a short clip extracted from a pre-recorded video, a short form video, gaming content, etc.

As shown in FIG. 2, display 200 can include a video playback area 210, a timed comment pane 220, comments with timed references 222 and 224, and an identified moment 226. In some embodiments, timed comment pane 220 can update the display of timed comments and moment(s) during playback of the media content item displayed in video playback area 210. In some embodiments, timed comment pane 220 can include moments identified at 106 in chronological order with timed comments. As shown, moment 226 can include any suitable text and/or graphics. For example, as shown, moment 226 can include the representative graphical icon indicating the reaction selected by viewers of the video content, a timestamp corresponding with the moment within the video (e.g., a time position of 1:05 within the video), and an indication of the size of the reaction (e.g., 2,000 viewers provided the reaction with the representative graphical icon).

Figure 5:
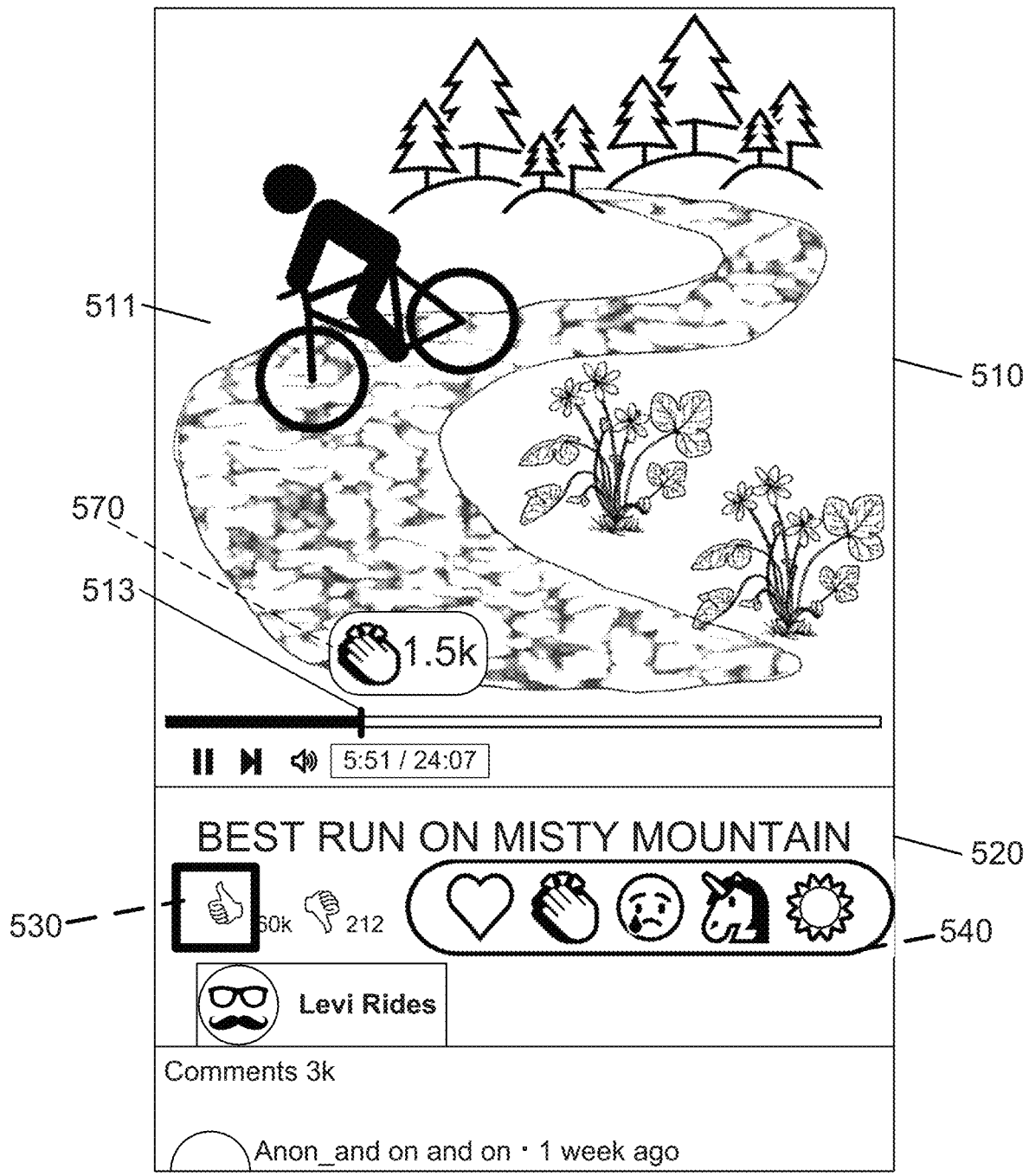

In another example, as shown in FIG. 5, moment 226 can be presented to the user by presenting the representative graphical icon, a reaction graphic, or a reaction animation within the timeline interface when the media content item reaches the playback position associated with the identified key moment. For example, the representative graphical icon associated with the identified key moment (e.g., a "heart" emoji) can be presented above the playhead or any other suitable indicator of the current playback position in the timeline interface. In another example, a reaction animation that indicates the graphical icon selected by the viewers at the identified key moment and that indicates an intensity of the reaction can be presented above the playhead or any other suitable indicator of the current playback position in the timeline interface. In yet another example, a reaction graphic that indicates the graphical icon selected by the viewers at the identified key moment and that indicates an intensity of the reaction can be presented above the playhead or any other suitable indicator of the current playback position in the timeline interface. In continuing this example, the reaction graphic can be an audience icon, such as a first audience icon that includes a single iteration of the representative graphical icon to indicate that a small number of viewers provided this reaction at that moment (e.g., a single heart emoji to indicate that less than 10 viewers provided this reaction at this time position within the video), a second audience icon that includes three iterations of the representative graphical icon to indicate that a greater number of viewers provided this reaction at that moment (e.g., a graphical icon having three heart emojis to indicate that between 10 and 100 viewers provided this reaction at this time position within the video); and a third audience icon that includes five iterations of the representative graphical icon to indicate that an even greater number of viewers provided this reaction at that moment (e.g., a graphical icon having five heart emojis to indicate that more than 100 viewers provided this reaction at this time position within the video).

In yet another example, in some embodiments, the one or more key moments can be presented in an overlay interface along with the media content item (e.g., a reactions overlay interface that is presented below the video, a reactions overlay interface that is positioned within a top portion of the video, a reaction teaser interface that includes a single selected reaction that is positioned adjacent to a video on a video watch page, etc.). Continuing this example, in some embodiments, the key moment can be presented with any suitable graphic to indicate the quantity of reactions in the key moment. For example, in some embodiments, a first graphic that includes a single iteration of the representative graphical icon can be used to indicate that a small number of viewers reacting at that moment (e.g., a single heart emoji to indicate that less than 300 viewers provided this reaction at this time position within the video). Continuing this example, in some embodiments, a second graphic with three iterations of the representative graphical icon, and a third graphic with five iterations of the reaction, can be used to indicate increasing numbers of viewers that reacted at that moment (e.g., a graphical icon having three heart emojis to indicate that about 500 viewers provided this reaction at this time position within the video and a graphical icon having five heart emojis to indicate that about 1000 viewers provided this reaction at this time position within the video, respectively).

It should be noted that, although the embodiments described herein generally describe the designation of a representative graphical icon for a key moment, this is merely illustrative and multiple graphical icons can be associated with the identified key moment and incorporated into the display. For example, in some embodiments, process 100 can present an animation representing the received reaction at the key moment. As a particular example, a key moment can contain a large number of received reactions using a "heart" icon (e.g., 500 reactions using a "heart" icon) and a smaller number of reactions using a "smiley face" icon (e.g., 10 reaction using a "smiley face" icon). In this example, process 100 can use a cascading animation with mostly "heart" graphics and a smaller number of "smiley face" graphics in proportion to the number of each respective reaction received at the key moment.

The representative graphical icon, reaction graphic, and/or reaction animation that are presented during the presentation of the media content item when a playhead reaches a playback position that corresponds with an identified key moment can, for example, provide the viewer of the media content item with the popular reaction at that identified moment without scrolling away from the media content item to view an engagement counter (e.g., a counter that shows the total number of likes). The representative graphical icon, reaction graphic, and/or reaction animation that are presented during the presentation of the media content item when a playhead reaches a playback position that corresponds with an identified key moment can also, for example, provide the viewer of the media content item with the general viewer reaction at portions of the media content item having substantial engagement.

In some embodiments, at 112, process 100 can return to 102 and can perform another iteration of process 100. As noted above, process 100 can be executed in response to detecting that a reactions database has been refreshed with new and/or modified reactions. In continuing this example, process 100 can return to 102 to determine whether there are additional key moments within the video content item based on the new and/or modified reactions. In another example, process 100 can be repeated in response to detecting that a number of new reactions have been received during the presentation of the media content item in a subsequent time window (e.g., the last 24 hours).

Figure 3:
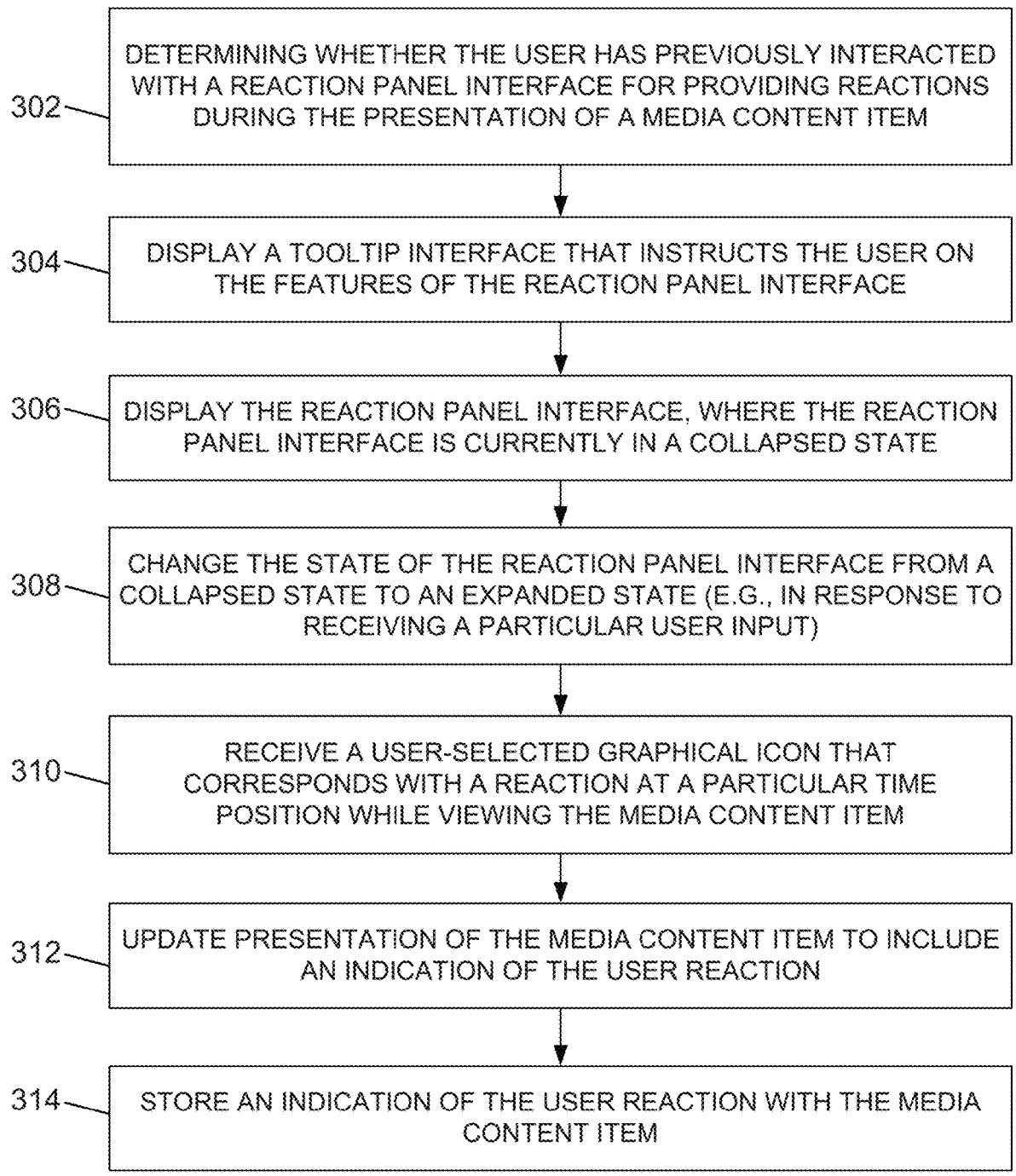
FIG. 3 shows an example flow diagram of a process for generating a user interface element for providing viewer reactions while presenting media content items in accordance with some embodiments of the disclosed subject matter.

Turning to FIG. 3, an example flow diagram of a process 300 for generating a reaction panel interface for providing viewer reactions while presenting media content items is provided in accordance with some embodiments of the disclosed subject matter.

In some embodiments, process 300 can be executed on a server such as server 902 and/or a user device such as user devices 906, described below in connection with FIG. 9. For example, the blocks of process 300 can be executed by a user device (e.g., a mobile phone, a tablet computer, a laptop computer, a desktop computer, a wearable computer, a streaming media device, a smart television, a game console, a vehicle entertainment system, and/or any other suitable user device) that streams video content from a server. Note that, in some embodiments, the blocks of process 300 can be performed by an application for streaming and presenting video content (e.g., an application associated with a particular video content service, and/or any other suitable application) that is executing on the user device.

In some embodiments, process 300 can be initiated in response to a user interacting with a web page and/or application service to view media content. For example, in some embodiments, process 300 can begin when a user launches a video sharing application and navigates to view a particular video (e.g., a live video, a replay of a previously live video, a previously recorded video, an on-demand video, etc.). As mentioned above, it should be noted that, although the embodiments described herein generally relate to providing a timed reaction during the presentation of a pre-recorded video that has been uploaded to a media sharing platform, this is merely illustrative. Timed reactions or other timed engagements can be provided in connection with any suitable media content item, such as live streamed video content, audio content, textual content, a short clip extracted from a pre-recorded video, a replay of previously live streamed video content, short form video content, gaming content, etc.

Figure 4A:
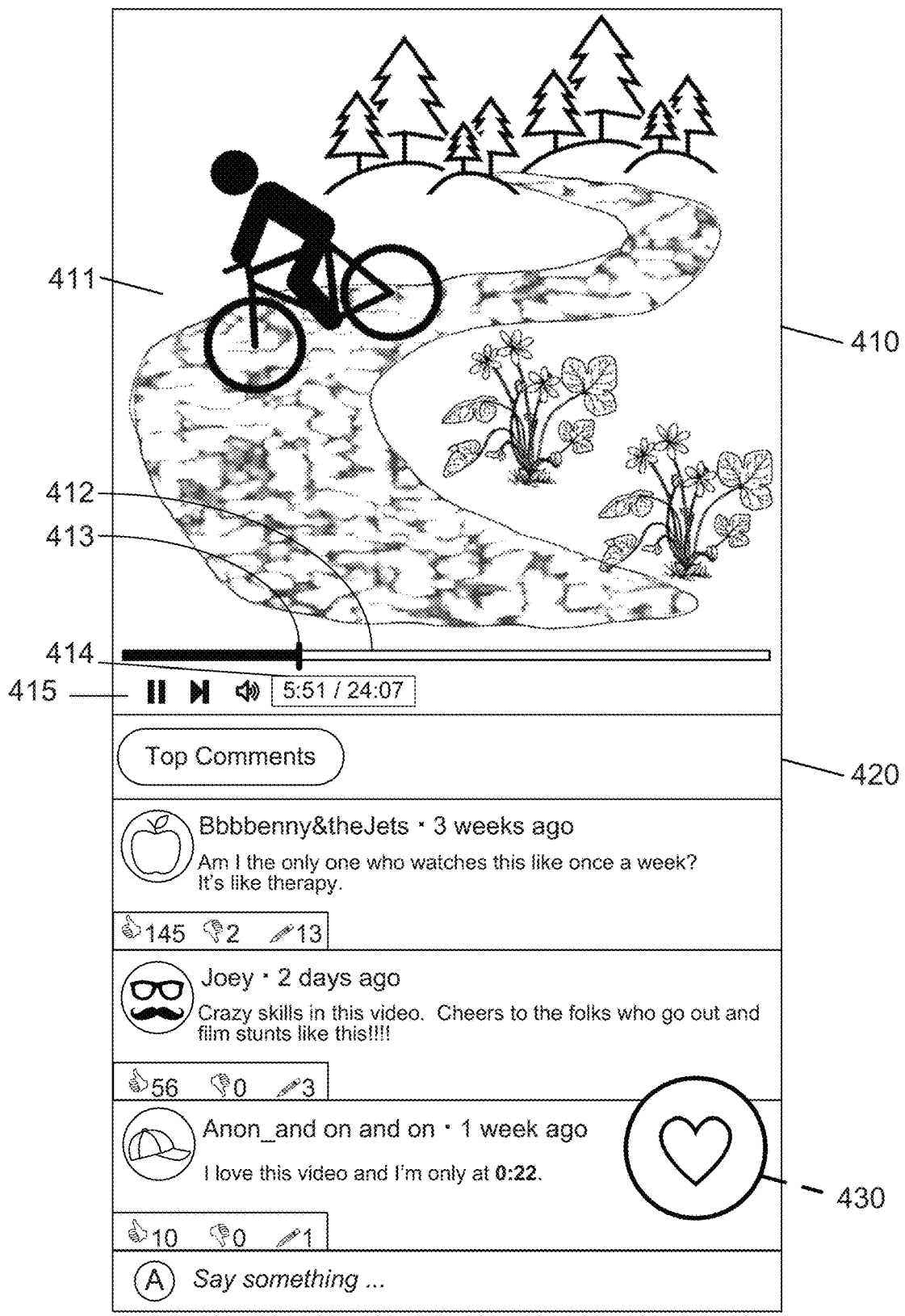
FIGS. 4A and 4D show illustrative display screens for providing viewer reactions while presenting media content items with a reaction interface panel that is currently in a collapsed state in accordance with some embodiments of the disclosed subject matter.
Figure 4B:
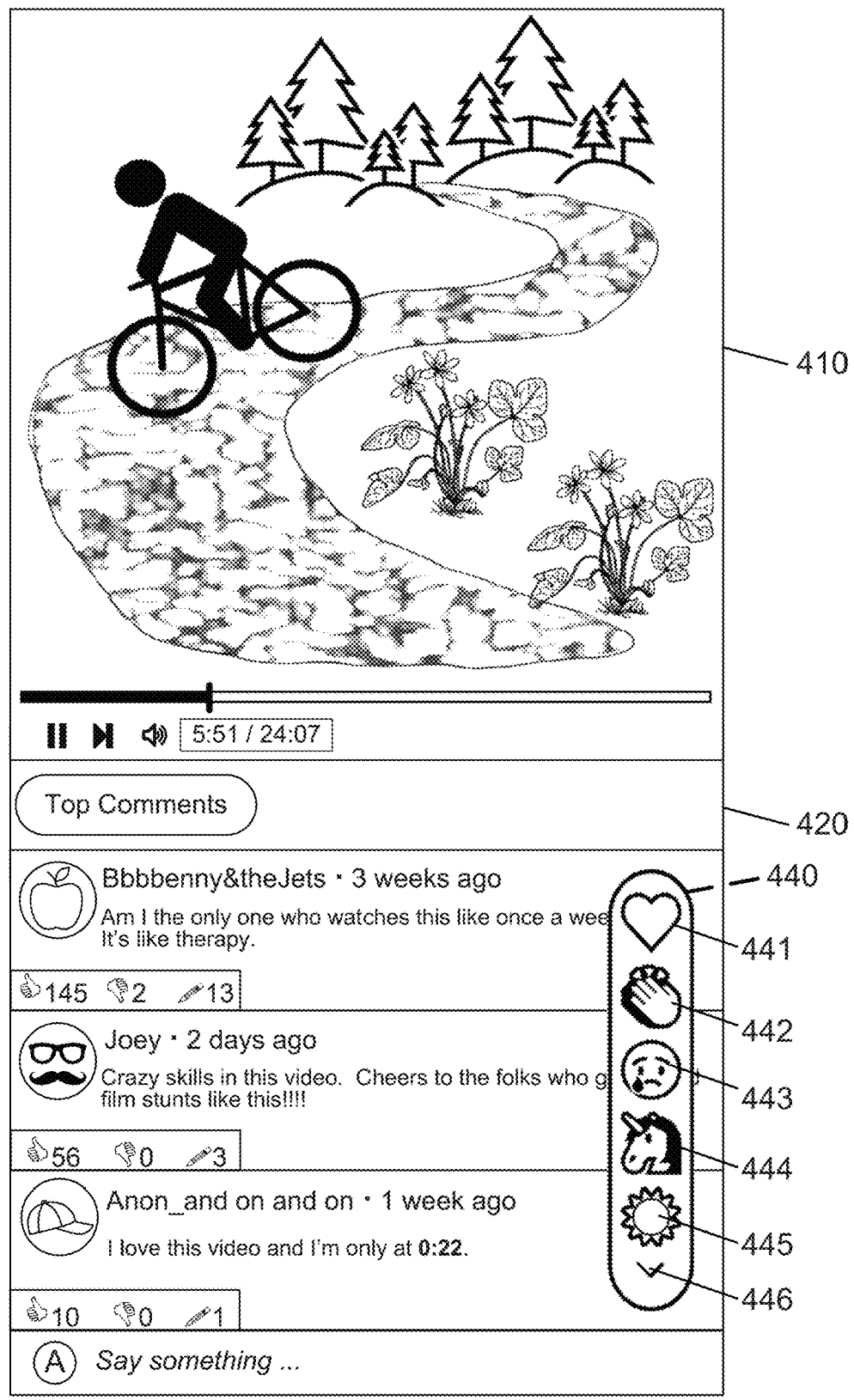
FIGS. 4B and 5 show illustrative display screens for providing viewer reactions while presenting media content items with a reaction interface panel that is currently in an expanded state in accordance with some embodiments of the disclosed subject matter.
Figure 4C:
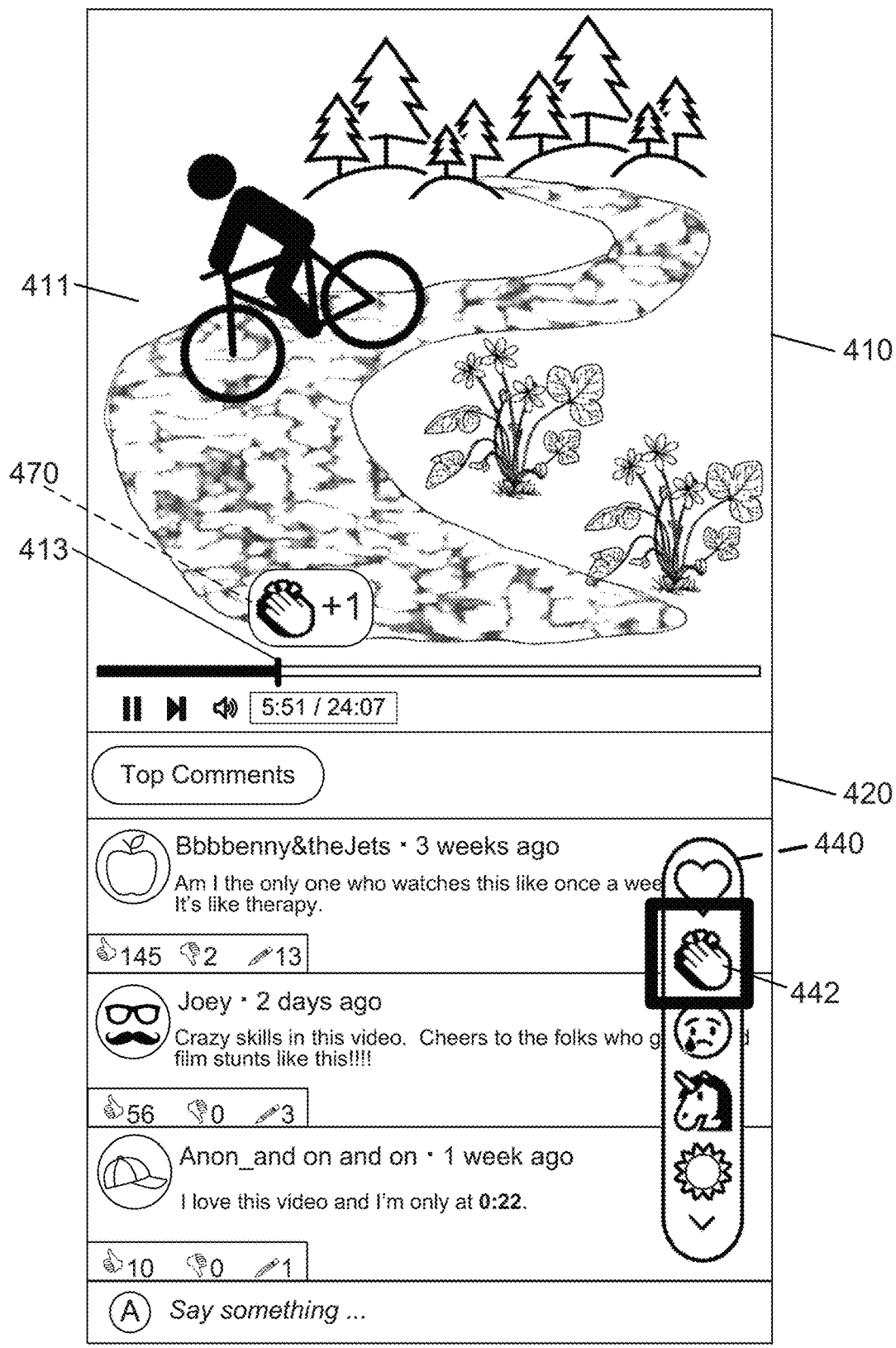
FIG. 4C shows an illustrative display screen for providing viewer reactions while presenting media content items with a reaction interface panel in which a user has selected a graphical icon corresponding to a reaction at a moment within a media content item in accordance with some embodiments of the disclosed subject matter.
Figure 4D:
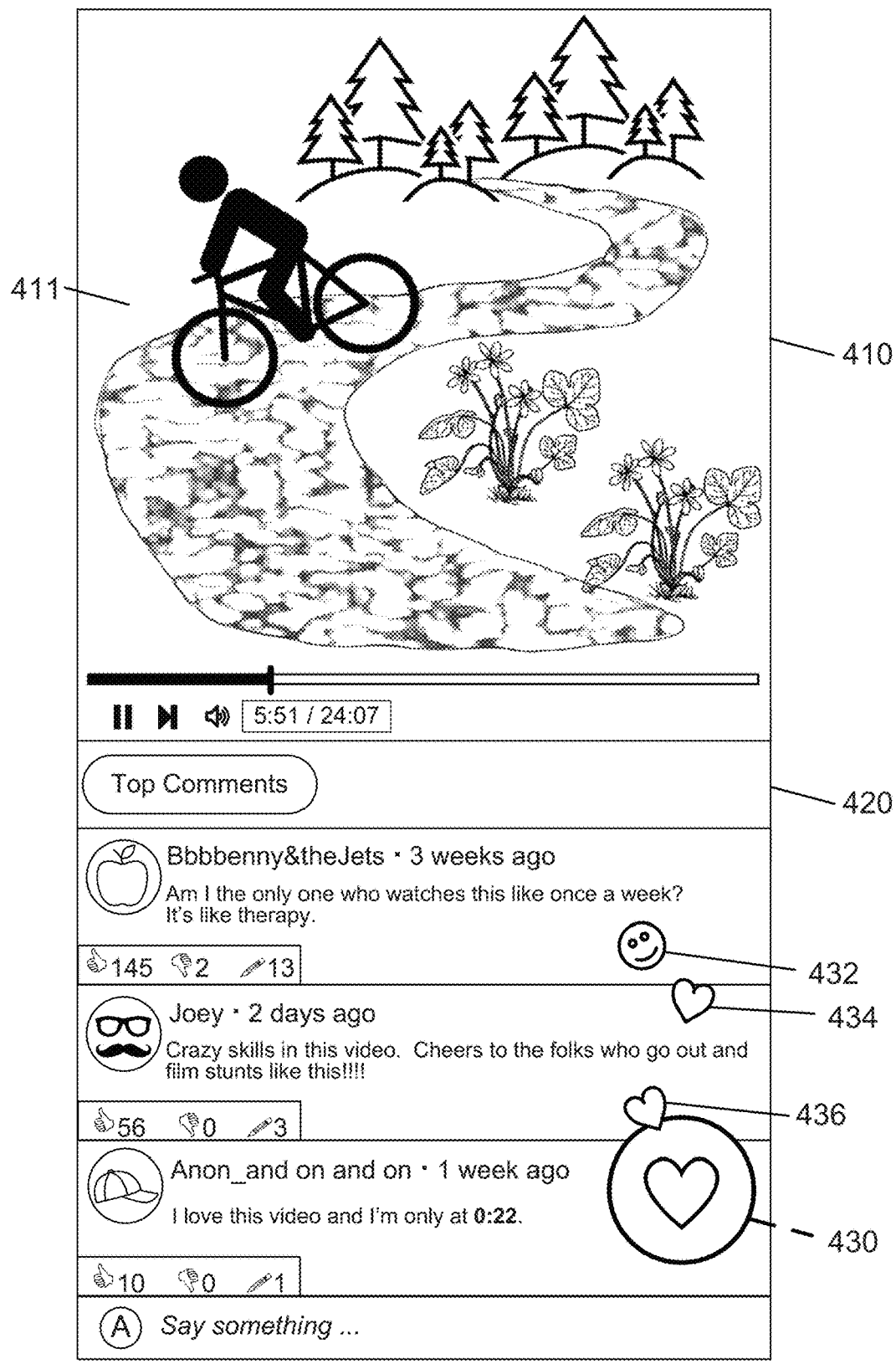

In some embodiments, prior to allowing the user to interact with the reaction panel interface for providing viewer reactions during the presentation of a media content item, process 300 can determine whether a content creator of the media content item has provided a suitable permission to render the reaction panel interface or otherwise provide viewer reactions during the presentation of a media content item. For example, in the instance in which the media content item is a live streamed media content item, the content creator of the live streamed media content item can provide a configuration indication that viewers of the live streamed media content item can be presented with the reaction panel interface to provide additional reactions during the live streaming of the media content item, but that the reaction panel interface is not to be presented during a replay of the live streamed media content item. In continuing this example, the reaction panel interface can be activated while presenting the live streamed media content item and can be deactivated or otherwise disabled from providing user-selected reactions in response to rewinding or replaying previously portions of the live streamed media content item. Although the reaction panel interface has been disabled and/or removed from the display screen, the fountain animation as shown in FIG. 4D or any other suitable mechanism for providing the aggregated viewer reactions during the presentation of the media content item can continue to be presented. This can, for example, provide the viewer with an indication of the aggregated viewer reaction at particular moments during the live streamed media content item.

In some embodiments, prior to allowing the user to interact with the reaction panel interface for providing viewer reactions during the presentation of a media content item, process 300 can determine whether configuration settings are associated with the reaction panel interface or whether the user has access to the reaction panel interface. For example, viewer-selected configuration settings can be provided that deactivate or otherwise inhibit the presentation of the reaction panel interface—e.g., the user has provided configuration settings that indicate the user is not interested in providing reactions to moments in the media content item using the reaction panel interface. In another example, a content creator of the media content item can provide configuration settings in which certain users can be provided with an opportunity to provide a reaction to a moment in the media content item using the reaction panel interface. In a more particular example, the configuration setting from the content creator can provide the reaction panel interface to users having user accounts that are subscribed to a channel associated with the content creator, users having user accounts that have an account privilege (whether paid or unpaid), etc. In continuing this example, a reaction panel interface having a first set of selectable graphical icons (e.g., a set of generic icons) can be presented to users that do not have a particular account privilege and a reaction panel interface having a second set of selectable graphical icons (e.g., a set of creator-selected icons, a set of member-only emoticons, etc.) can be presented to users that have the particular account privilege.

In some embodiments, prior to allowing the user to interact with the reaction panel interface for providing viewer reactions during the presentation of a media content item, process 300 can determine whether the user has previously interacted with the reaction panel interface at 302. For example, in some embodiments, process 300 can determine, using a user account, username, user ID, and/or any other identifying features, that the user has not previously interacted with the reaction panel interface. In a more particular example, in some embodiments, process 300 can query a logging service to determine whether the reaction panel interface for providing viewer reactions during the presentation of a media content item has been previously rendered in the video sharing application executing on the user device. In another more particular example, in some embodiments, an indication can be stored in association with the user account that indicates whether this is the first instance the reaction panel interface has been rendered in the video sharing application executing on the user device.

In response to determining that the user has not previously interacted with the reactions panel interface at 302, process 300 can display a tooltip interface that instructs the user on the features of the reaction panel interface. For example, the tooltip interface can provide a sequence of images that illustrate the multiple states of the reactions panel interface—e.g., a collapsed state with a default graphical icon for providing a reaction to the current playback position of the media content item (e.g., a single "heart" emoji), a collapsed state in which a single graphical icon is presented and can be modified to a representative graphical icon during the presentation of the media content item to indicate the aggregated viewer reaction at the current playback position of the media content item (e.g., changing a single "heart" emoji to a single "crying" emoji to indicate the popular viewer reaction at that moment in the video content item), and an expanded state in which the user can select from a menu of graphical icons for providing a reaction to the current playback position of the media content item. In another example, the tooltip interface can provide a sequence of images that illustrate the user interactions with the graphical icons in the reactions panel interface—e.g., selecting a graphical icon can cause the reaction to be presented in the media content item at the current playback position of the media content item, selecting a graphical icon multiple times within a particular period of time can cause an animated reaction to be presented in the media content item at the current playback position of the media content item, etc. In yet another example, the tooltip interface can provide a sequence of images that illustrate the different representative graphical icons presented on the playhead or timeline interface of the video window, where different representative graphical icons can indicate the aggregated viewer reaction at the current playback position of the media content item and/or can indicate the relative intensity of the aggregated viewer reaction (e.g., a relatively large number of received reactions at that moment in the media content item).

It should be noted that, in some embodiments, the tooltip interface can allow the user to select a portion of the reaction panel interface to receive feature information relating to the selected portion of the reaction panel interface. It should be also noted that, in some embodiments, the tooltip interface can be an animated tutorial that guides the user through the features of the reaction panel interface described in process 300 of FIG. 3 and shown in the user interfaces of FIGS. 4A-5.

In some embodiments, the tooltip interface can be presented in response to receiving a user selection indicating interest in providing reactions during the presentation of a media content item. For example, in response to viewing a media content item in the video sharing application and determining that the video sharing application has not previously rendered the reaction panel interface, the video sharing application can present a message that instructs the user to provide a particular user input to present the tooltip interface and/or the reaction panel interface (e.g., a "Long press the like button to try more reactions" message). In response to receiving the particular user input, the tooltip interface can be presented to the user within the video sharing application.

In some embodiments, process 300 can continue to display the reaction panel interface within the video sharing application at 306. For example, as shown in FIG. 4A, the reaction panel interface can be initially displayed in a collapsed state with a default graphical icon for providing a reaction to the current playback position of the media content item (e.g., a single "heart" emoji). In another example, the reaction panel interface can be initially displayed in a collapsed state in which a single graphical icon is presented, where the single graphical icon can be modified to a representative graphical icon during the presentation of the media content item to indicate the aggregated viewer reaction at the current playback position of the media content item (e.g., changing a single "heart" emoji to a single "crying" emoji to indicate the popular viewer reaction at that moment in the video content item). In yet another example, as shown in FIGS. 4B and 4C, the reaction panel interface can be initially displayed in an expanded state in which the user can select from a menu of graphical icons for providing a reaction to the current playback position of the media content item.

In a more particular example, FIG. 4A shows an illustrative display screen 400 for providing viewer reactions while presenting media content items in accordance with some embodiments of the disclosed subject matter. As shown, display screen 400 can include a video area 410, a comment panel 420, and a reaction panel interface 430 that is currently in a collapsed state. As shown in FIG. 5, display screen 500 can also include information, such as a video title, a channel name, a view count, a like count, a dislike count, a video description, video chapter links, and/or any other suitable information.

In some embodiments, video area 410 can include any suitable display elements, such as a video playback region 411, a progress bar 412, a playhead 413, a timestamp 414, and one or more media controls 415. Video playback region 411 can present any suitable video content 411, such as video-on-demand content, user-generated video content, live streamed video content, a replay of live streamed video content, a short clip extracted from pre-recorded video content, short form video content, etc. As shown in FIG. 4A, progress bar 412 can provide a timeline interface that indicates how much of the video has been watched and playhead 413 can be represented by a graphical line in the timeline interface that represents the current playback position or current frame of the video being played back. In some embodiments, video area 410 can present timestamp 414 to indicate the corresponding time reference at the current playback position or current frame of the video being played back, where the time reference can be expressed as a time out of the total length of the video.

In some embodiments, comment panel 420 can include any suitable controls to sort user-submitted comments that are associated with a video content item. As shown in FIG. 4A, comment panel 420 can be sorted by "top comments." Alternatively, in some embodiments, comment panel 420 can sort user-submitted comments by any other suitable approach, such as most recent comments, timed comments, pinned comments, etc.

In some embodiments, reaction panel interface 430 can provide the user with an interface for selecting a reaction to the current playback position of the media content item. As shown in FIG. 4A, reaction panel interface 430 can be initially displayed in a collapsed state with a default graphical icon for providing a reaction the current playback position of the media content item (e.g., a single "heart" emoji).

It should be noted that reaction panel interface 430 can be presented in any suitable location within display screen 400. For example, as shown in FIG. 4A, reaction panel interface 430 can be positioned as an overlay within comment panel 420. More particularly, reaction panel interface 430 can be positioned in a lower right portion of comment panel 420 and can be displayed over comments and other comment-related information displayed within comment panel 420. In another example, such as when the user device is a mobile device that is presenting the media content item in a landscape mode, reaction panel interface 430 can be overlaid onto the media content item, where reaction panel interface 430 can be toggled between an active state in which reaction panel interface 430 can be overlaid onto a right hand portion of the media content item and an inactive state in which reaction panel interface 430. In yet another example, such as when the media content item is a live streamed video with a live chat interface, reaction panel interface 430 can be positioned in a portion of the live chat interface.

It should also be noted that reaction panel interface 430 can include any suitable graphic. For example, in some embodiments, a graphical icon presented within reaction panel interface 430 can be a default graphical icon selected from a menu of selectable graphical icons. For example, as shown in FIG. 4A, a "heart" emoji was selected from multiple graphical icons as the default graphical icon for presentation on reaction panel interface 430.

In some embodiments, the default graphical icon in reaction panel interface 430 can be modified to a representative graphical icon during the presentation of the media content item to indicate the aggregated viewer reaction at the current playback position of the media content item. For example, the "heart" emoji in reaction panel interface 430 can transition to present a single "crying" emoji to indicate the popular viewer reaction at that moment in the video content item. In a more particular example, the single graphical icon presented in the reaction panel interface can be animated to transition between representative graphical icons based on the aggregated viewer reaction as the media content item is being played back. It should be noted that, in instances in which the current playback position does not correspond with an identified key moment of the media content item, no default graphical icon can be presented in reaction panel interface 430 and selection of reaction panel interface 430 can transition to an expanded state to select from a menu of graphical icons to provide a reaction to the current playback position of the media content item.

In some embodiments, reaction panel interface 430 that is in a collapsed state can present a fountain animation of viewer reactions as they are being received. For example, in the instance in which the video sharing application is a live video chatting application, selected graphical icons that represent user reactions can be presented with a fountain animation in which the received user reactions are flowing upwards and out of reaction panel interface 430. In a more particular example, as shown in FIG. 4D, in response to receiving a "smiley face" icon to represent a first received reaction followed by a "heart" icon to represent a second received reaction and another "heart" icon to represent a third received reaction to a moment in the video, a fountain animation can be presented in connection with reaction panel interface 430 in which a "smiley face" icon 432 flows from reaction panel interface 430 followed in time and vertical order by a "heart" icon 434 and another "heart" icon 436. In continuing this example, the presented icons in the fountain animation that correspond to the received reactions can fade as the icons reach a portion of display screen 400 (e.g., video area 410).

In some embodiments, the default graphical icon can be associated with a corresponding reaction and, in response to receiving a user selection of the default graphical icon on reaction panel interface 430, the corresponding reaction can be associated with the current playback position of the media content item (e.g., a "love" reaction by the user at t=1:25 of the video content item). Alternatively, in some embodiments, in response to receiving a user selection of the default graphical icon, reaction panel interface 430 can transition from a collapsed state shown in FIG. 4A to an expanded state 440 shown in FIG. 4B.

Alternatively, in some embodiments, reaction panel interface 430 can be associated with multiple actions based on the received user input. For example, in the instance in which the user device is a mobile device having a touch-sensitive display, a user input that is deemed to be a short press of the default graphical icon of reaction panel interface 430 can cause the corresponding reaction (e.g., a "love" reaction) to be provided in connection with the current playback position of the media content item and a user input that is deemed to be a long press of the default graphical icon of reaction panel interface 430 can cause reaction panel interface 430 to transition from the collapsed state 430 shown in FIG. 4A to an expanded state 440 as shown in FIG. 4B.

Referring back to FIG. 3, in response to receiving a suitable user input (e.g., a tapping input on the collapsed reaction panel interface, a long press on the collapsed reaction panel interface, etc.), process 300 can expand the reaction panel interface at 308. For example, in the instance where the reaction panel interface is initially displayed in a collapsed state and in response to receiving a suitable user input, process 300 can expand the reaction panel interface to present multiple graphical icons that can be selected by the user to provide a reaction to the current playback position of the media content item.

As shown in FIG. 4B, the reaction panel interface 430 can be vertically expanded to reaction panel interface 440 that includes a "heart" icon 441, a "clapping hands" icon 442, a "crying" icon 443, a "unicorn" icon 444, and a "sun" icon 445, where each of the selectable icons can correspond with a particular reaction to the content being presented at the current playback position of the media content item. Examples of reactions to a moment in the media content item can include: love, support, and other positive feelings; humorous feelings; encouragement, agreement, applause, approval, celebration, and other supporting feelings; surprise, amazement, discovery, breakthrough, new information, and other learning/surprised feelings; and/or empathy, care, sadness, and other compassionate feelings. For example, "heart" icon 441 can correspond with a love or support reaction by the user that is viewing the video content and "clapping" icon 442 can correspond with an applause or approval reaction by the user that is viewing the video content. It should be noted that reaction panel interface 440 can be expanded to include any suitable graphical icons (e.g., pictograms, embedded smileys, emoji, gifs, phrases, images, animated and/or stationary stickers, etc.) and any suitable number of graphical icons for selection by the user that is viewing video content in video area 410. It should also be noted that reaction panel interface 440 can include a collapse button 446 that, when selected, causes reaction panel interface 440 to collapse back to reaction panel interface 430.

In some embodiments, the graphical icons that each correspond to a user reaction in the reaction panel interface can be selected using any suitable approach. For example, in some embodiments, each of the graphical icons can be selected based on the most popular graphical icons used in the video sharing application to react to video content items. In another example, in some embodiments, a set of graphical icons from multiple sets of graphical icons can be selected for providing in the reaction panel interface based on video information (e.g., content-related information in video metadata), based on content creator information (e.g., reactions that are commonly provided in videos uploaded by the content creator), based on application information (e.g., reactions that are commonly provided in a messaging application installed on a user device), etc. In yet another example, in some embodiments, the content creator that uploaded the media content item can select the graphical icons or the set of graphical icons for inclusion in the reaction panel interface.

It should be noted that reaction panel interface 430 can be expanded in any suitable manner. For example, in some embodiments, reaction panel interface 430 can be expanded horizontally from the single graphical icon to the menu of multiple selectable icons. In another example, in some embodiments, reaction panel interface 430 can be expanded vertically in which each of the selectable graphical icons can be enlarged to promote the user selection of one of the graphical icons. In yet another example, turning to FIG. 5, an illustrative display screen 500 can be presented in which display screen 500 can include a video area 510 and a like button 530 within a video information panel 520. In the instance in which the user device is a mobile device having a touch-sensitive display, a user input that is deemed to be a short press of like button 530 can add to the like count associated with the media content item and a user input that is deemed to be a long press of like button 530 (e.g., holding like button 530 for more than two seconds) can cause reaction panel interface 540 to be displayed to provide a reaction to a moment within the media content item.

It should be noted that reaction panel interface 440 can be presented in any suitable location within display screen 400. For example, as shown in FIG. 4B, reaction panel interface 440 can be positioned as an overlay within comment panel 420. More particularly, reaction panel interface 440 can be positioned in a lower right portion of comment panel 420 and can be displayed over comments and other comment-related information displayed within comment panel 420. In another example, reaction panel interface 440 can be presented above progress bar 412 and within video area 410 in response to a reaction prompt that is presented during the media content item reaching a key moment. In a more particular example, in response to reaching a time position in the media content item that corresponds to a key moment, the user can be presented with a reaction prompt, such as "React to 1:53 in the video," and, in response to selecting the reaction prompt, reaction panel interface 440 can be presented above progress bar 412 and within video area 410 to provide the user with an opportunity to react to that moment within the media content item.

In some embodiments, when reaction panel interface 440 has been expanded, additional reaction features can be activated within the other interface elements of display screen 450.

For example, as mentioned above in connection with FIG. 4D, when reaction panel interface 430 is in a collapsed state, a fountain animation of viewer reactions can be presented to indicate viewer reactions as they are being received. In response to expanding reaction panel 440, the fountain animation of viewer reactions can be positioned within video area 410. For example, in the instance in which the video sharing application is a live video chatting application, selected graphical icons that represent user reactions can be presented with a fountain animation in which the received user reactions are flowing upwards and out of playhead 413 in progress bar 412.

In another example, when reaction panel interface 440 has been expanded to present multiple graphical icons for selecting a user reaction to a particular portion of the media content item, the timeline interface that includes progress bar 412 and playhead 413 can be modified to present the aggregated viewer reaction at particular moments within the media content item. This can, for example, provide the user with an opportunity to provide a reaction to a particular moment within the media content item while allowing the user to see how other viewers reacted to that particular moment within the media content item. In a more particular example, a representative graphical icon that corresponds to the aggregated viewer reaction upon reaching a particular moment within the media content item can be presented above playhead 413 in progress bar 412—e.g., a bubble element that includes a "heart" icon to indicate the popular reaction at that particular moment in the media content item along with a count that indicates the number of "heart" reactions received at that particular moment in the media content item can be presented. In another more particular example, in instances in which the progress bar is hidden or otherwise inhibited from being presented, progress bar 412 can re-appear upon reaching a particular moment within the media content item in which a representative graphical icon that corresponds to the aggregated viewer reaction can be presented above playhead 413.

Figure 4E:
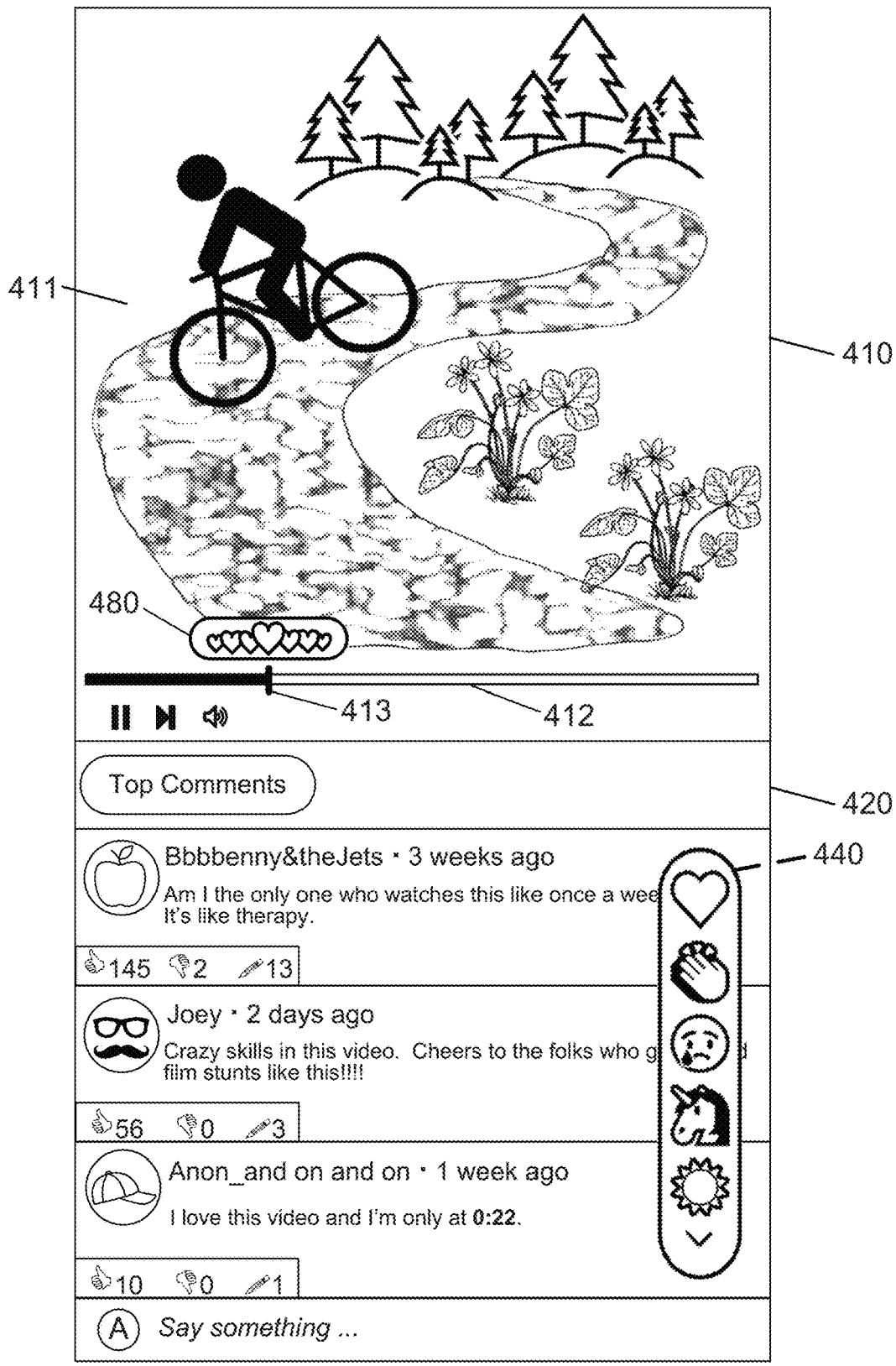
FIG. 4E shows an illustrative display screen for providing viewer reactions while presenting media content items with a reaction interface panel in which an audience icon indicating the relative intensity of the aggregated viewer reaction in accordance with some embodiments of the disclosed subject matter.

In some embodiments, the relative intensity of the aggregated viewer reaction at a particular moment within the media content item can be represented by the graphical icon presented above playhead 413 in progress bar 412. In continuing the example above in which a bubble element that includes a "heart" icon to indicate the popular reaction at that particular moment in the media content item, different "heart" graphical icons can be selected for presentation in the timeline interface based on the relative intensity of the aggregated viewer reaction at a particular moment within the media content item. The selected reaction graphic can be one of: a first graphic that includes a single iteration of the representative graphical icon to indicate that a small number of viewers provided this reaction at that moment (e.g., a single heart emoji to indicate that less than 10 viewers provided this reaction at this time position within the video); a second graphic that includes three iterations of the representative graphical icon to indicate that a greater number of viewers provided this reaction at that moment (e.g., a graphical icon having three heart emojis to indicate that between 10 and 100 viewers provided this reaction at this time position within the video); and a third graphic that includes five iterations of the representative graphical icon to indicate that an even greater number of viewers provided this reaction at that moment (e.g., a graphical icon having five heart emojis to indicate that more than 100 viewers provided this reaction at this time position within the video). For example, as shown in FIG. 4E, an audience icon 480 can be presented above playhead 413 in progress bar 412 that indicates the relative intensity of the aggregated viewer reaction, where the number of hearts in the audience icon indicates that a relatively large number of "heart" reactions were received at that moment in the media content item. It should be noted that, in some embodiments, presenting a reaction graphic that represents the relative intensity of the aggregated viewer reaction can replace the presentation of a count that indicates the number of "heart" reactions received at that particular moment in the media content item (e.g., 1.5 k hearts).

Alternatively, in some embodiments, a fountain animation can be presented within the video region that can indicate the relative intensity of the aggregated viewer reaction at a particular moment within the media content item. For example, upon reaching a key moment within the media content item, a fountain animation can be selected based on the relative intensity of the aggregated viewer reaction (e.g., a few hearts rising from the playhead for a moment having a relatively small viewer reaction and many hearts rising from the playhead for a moment having relatively large viewer reaction) and can be presented within the video region such that the fountain animation is overlaid onto the media content item being played back in the video region, where the fountain animation can show multiple graphical icons flowing from the playhead and into the media content item. It should be noted that any suitable graphic or animation can be applied to the media content item to represent the aggregated viewer reaction and/or the intensity of the aggregated viewer reaction at a moment, such as a cascade of the representative graphical icon, a larger version of the representative graphical icon, etc.

It should be noted that, in such an embodiment, the representative graphical icon that corresponds to the aggregated viewer reaction can be presented when more than a threshold number of reactions have been received (e.g., a relatively large number of reactions when compared to a threshold value, when compared with previously received reactions, when compared against the total number of reactions received in the media content item, etc.). In continuing this example, when less than a threshold number of reactions have been received, the bubble element that includes a "heart" icon to indicate the popular reaction at that particular moment in the media content item along with a count that indicates the number of "heart" reactions received at that particular moment in the media content item can disappear or otherwise be inhibited from being presented in the timeline interface.

It should also be noted that, in connection with the collapsed state of the reaction panel interface, these additional reaction features can be deactivated within the other interface elements of display screen 450. For example, in response to collapsing the reaction panel interface (e.g., FIG. 4A), the timeline interface that includes progress bar 412 and playhead 413 can be modified to no longer present the aggregated viewer reaction at particular moments within the media content item. In a more particular example, the bubble element that includes a "heart" icon to indicate the popular reaction at that particular moment in the media content item along with a count that indicates the number of "heart" reactions received at that particular moment in the media content item can disappear or otherwise be inhibited from being presented in the timeline interface. In some embodiments, as mentioned above, the single representative icon presented in the collapsed reaction panel interface can continue to transition between different representative graphical icons to provide an indication of the aggregated viewer reaction as key moments of the media content item are being played back.

Referring back to FIG. 3, in response to presenting reaction panel interface 440 during the presentation of the media content item, process 300 can receive a user selection of one of the graphical icons that corresponds with a reaction at a particular time position within the media content item. For example, as shown in FIG. 4C, in response to presenting reaction panel interface 440 during the presentation of the media content item, process 300 can receive a user selection of "clapping hands" icon 442 (as illustrated by the highlight region placed around "clapping hands" icon 442) when the video content item has reached a particular time (e.g., time 5:51 out of 24:07 as indicated by timestamp 513).

It should be noted that, in some embodiments, upon receiving a user selection of one of the graphical icons that corresponds with a reaction at a particular time position within the media content item, reaction panel interface 440 can transition back to a collapsed state, such as reaction panel interface 430 shown in FIG. 4A.

In response to receiving the user reaction, process 300 can update the presentation of the media content item to include an indication of the user reaction.

For example, as shown in FIG. 4C, in response to presenting reaction panel interface 440 during the presentation of the media content item and receiving a user selection of "clapping hands" icon 442 when the video content item has reached a particular time, process 300 can present the selected graphical icon within the video content item. More particularly, as shown in FIG. 4C, the selected "clapping hands" icon 442 can be presented above playhead 413 in progress bar 412 for a particular period of time (e.g., two seconds).

In another example, as also shown in FIG. 4C, in response to presenting reaction panel interface 440 during the presentation of the media content item and receiving a user selection of "clapping hands" icon 442 when the video content item has reached a particular time, process 300 can determine whether the selected graphical icon corresponds with the representative graphical icon associated with the aggregated viewer reaction. In response to determining that the selected graphical icon corresponds with the representative graphical icon, process 300 can present an animation that indicates the user reaction is the same as the overall audience reaction. For example, as shown in FIG. 4C, in response to the user selection of "clapping hands" icon 442 at that particular moment in the video, process 300 can retrieve stored reactions that were received from other viewers and that are associated with the video, determine whether the user reaction matches the popular viewer reaction at that particular moment and, in response, can present an animation that increases the size of the previously presented bubble element above playhead 413 in progress bar 412 and adds a "+1" element. This can, for example, indicate that the reaction received from the user is in agreement with the popular viewer reaction at that moment in the video.

In some embodiments, different user inputs to reaction panel interface 440 can cause different incorporations of the corresponding reaction into the presentation of the media content item. For example, in response to receiving multiple selections of a graphical icon within a particular period of time (e.g., ten presses of the "heart" icon within a five second time span), an animation can be triggered that incorporates the corresponding reaction into the presentation of the media content item. Such an animation can, for example, indicate to other viewers and the content creator the strong reaction to the content being presented at that moment within the media content item. In a more particular example, in response to receiving multiple selections of a "heart" emoji within a five second time span from a particular moment being presented in a video, a spark animation or a fountain animation (similar to the fountain animation shown in FIG. 4D) can be triggered in which multiple "heart" objects can be overlaid onto the video content item for a predetermined amount of time and in which the multiple "heart" objects can fade into the video content item.

In some embodiments, a confirmation interface can be presented in response to receiving a selection of a graphical icon during the presentation of the media content item. For example, in response to receiving a user selection of "clapping hands" icon 442 when the video content item has reached a particular time, a confirmation interface can be presented that includes a thumbnail or extracted image of the moment at which the reaction was received and a description of the reaction along with a timestamp associated with the reaction (e.g., "you loved this @ 2:15"). In continuing this example, the confirmation interface can also provide the user with the opportunity to remove the reaction within a particular period of time.

Referring back to FIG. 3, in some embodiments, process 300 can store an indication of the user reaction with the media content item at 314. For example, in response to receiving a user-selected graphical icon that corresponds with a reaction at a particular time position within the media content item, process 300 can store, in a row of a reactions database, a media identifier corresponding to the media content item, a creator identifier corresponding to a user account of the content creator that uploaded the media content item, a time reference associated with the time that the reaction was received, a graphical icon that was selected by the user (e.g., a "heart" icon), a reaction corresponding to the selected graphical icon, etc. As described above, the reactions database including the stored reaction can be reviewed along with other received reactions to determine aggregated viewer reactions within the media content item and to identify key moments within the media content item.

It should be noted that process 300 can be executed any suitable number of times. For example, in some embodiments, process 300 can be executed at a later time during presentation of the same video. Continuing this example, in some embodiments, the user can start a new iteration of process 300 by selecting a selectable graphical icon on the reaction menu panel to submit a second reaction at another moment while viewing the video.

As described herein, each identified key moment in a media content item can be associated with a representative graphical icon, a reaction graphic, and/or a reaction animation that is presented to a user that is playing back the media content item at time windows corresponding to those key moments. For example, as shown in FIG. 5, when a video 511 that is being presented in video area 510 reaches a particular time that corresponds to a time window associated with an identified key moment (e.g., 5:51/24:07 in FIG. 5), a representative graphical icon 570 associated with the identified key moment can be presented above a playhead 513 or any other suitable indicator of the current playback position in the timeline interface. In another example, additionally or alternatively to the representative graphical icon 570 being presented, a reaction animation that indicates the representative graphical icon at the identified key moment and/or that indicates an intensity of the aggregated viewer reaction can be presented above playhead 513—e.g., a bubble animation that includes an enlarged version of the representative graphical icon 570 can momentarily appear above playhead 513; a bubble animation that includes an audience icon that represents both the popular reaction at the identified key moment and the relative intensity of the reaction, where the size of the audience icon can change based on the relative intensity of the reaction; a fountain animation that includes multiple graphical icons flowing from playhead 513 and into the media content item being played back; a fountain animation that that represents both the popular reaction at the identified key moment by presenting multiple graphical icons flowing from playhead 513 and into the media content item being played back and the relative intensity of the reaction based on the number and/or size of the graphical icons flowing from playhead 513; a spark animation that appears at or around the representative graphical icon being presented above playhead 513.

It should be noted that the representative graphical icon, the reaction graphic, and/or the reaction animation can be positioned in display screen 500 at any suitable location. For example, as mentioned above, the representative graphical icon, the reaction graphic, and/or the reaction animation can be incorporated into the media content item, where the representative graphical icon, the reaction graphic, and/or the reaction animation can overlay a portion of the media content item. In another example, as mentioned above, the representative graphical icon, the reaction graphic, and/or the reaction animation can appear within the reaction panel interface or around the reaction panel interface (e.g., an audience icon flowing out of a collapsed reaction panel interface at a key moment). In yet another example, a timed comment pane, such as comment pane 220, a chat interface, or any other suitable region can be updated to include the representative graphical icon, the reaction graphic, and/or the reaction animation at the identified key moment. For example, as shown in FIG. 2, moment 226 can be presented to include the representative graphical icon indicating the popular reaction selected by viewers of the media content item, a timestamp corresponding with the moment within the video (e.g., a time position of 1:05 within the video), and an indication of the size of the reaction (e.g., 2,000 viewers provided the reaction with the representative graphical icon).

It should also be noted that the representative graphical icon, the reaction graphic, and/or the reaction animation can be presented with any other suitable information, such as a reaction count (e.g., 1.5 k hearts, 2 k users reacted, etc.), one or more user avatars to indicate the users that contributed to the most popular viewer reaction in the identified key moment, an identification that a key moment has been identified (e.g., a thumbnail image of the key moment along with the text "key moment"), etc.

Additionally to presenting the representative graphical icon, the reaction graphic, and/or the reaction animation, the key moments identified within a media content item can be indicated along the timeline interface. For example, in a region above the timeline interface, a graphical icon that represents the popular reaction or sentiment at an identified key moment can be presented above portions of the timeline interface that correspond with the time windows for each key moment (e.g., a "heart" icon at or around 1:00 in the video timeline, a "crying" icon at or around 2:30 in the video timeline, a "celebration" icon at or around 5:00 in the video timeline). This can, for example, allow a viewer to see the identified key moments in the media content item, to see audience reactions at each of the identified key moments, and navigate between key moments when scrubbing the progress bar that is part of the timeline interface.

In some embodiments, in response to identifying one or more key moments within a media content item, additional user inputs can be provided that allow a user to navigate between the identified key moments. For example, in the instance in which the user device is a mobile device having a touch-sensitive display, a double tap input or a swipe input received at the user device can cause the video player application to navigate between identified key moments, where a double tap received at a left portion of the touch-sensitive display or a swipe left input received at the user device can cause the video player application to navigate to the previous key moment based on the current playback position and a double tap received at a right portion of the touch-sensitive display or a swipe right input received at the user device can cause the video player application to navigate to the next key moment based on the current playback position.

In some embodiments, in addition to providing reaction panel interfaces that allow a user to provide a reaction to a moment within a media content item, identifying key moments based on aggregated viewer reactions, and presenting a graphical icon that represents aggregated viewer reactions at key moments within the media content item during the playback of the media content item, additional features in connection with the identified key moments can be provided to content creators. In reviewing identified key moments and non-moments within a media content item, a content creator can, for example, gain an understanding of how an audience feels about different moments within the media content item, gain an understanding of which moments within the media content item that the audience provided the most reactions or engagement, and provide an interaction mechanism between the content creator and the viewer in which the content creator can be provided with an opportunity to respond to the popular viewer reaction or sentiment at an identified key moment.

Figure 6:
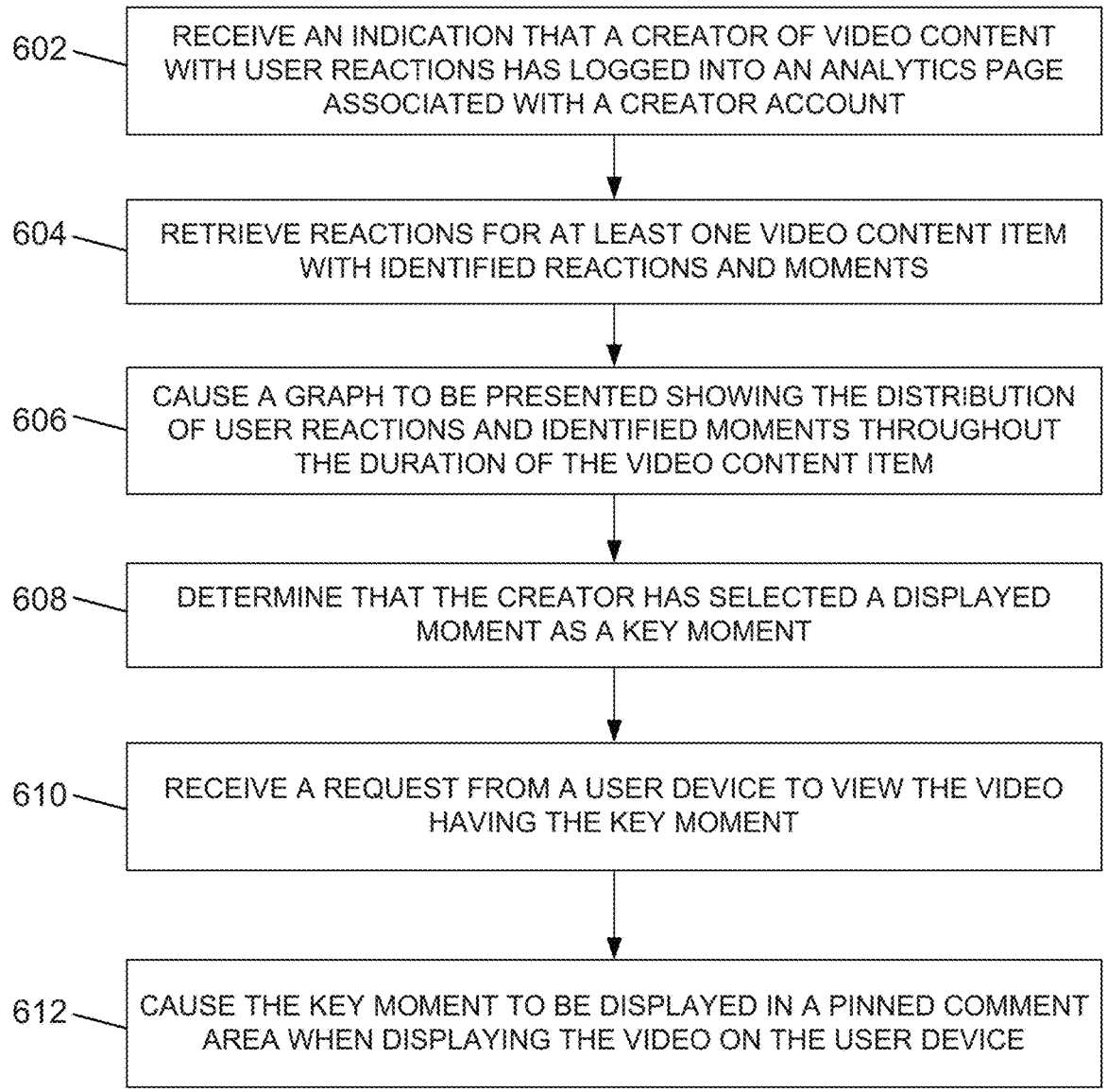
FIG. 6 shows an example flow diagram of a process for reviewing and/or responding to key moments in a media content item in accordance with some embodiments of the disclosed subject matter.

Turning to FIG. 6, an example flow diagram of a process 600 for content creators to present media content items with viewer reactions in accordance with some embodiments of the disclosed subject matter is shown.

In some embodiments, process 600 can be executed on a server such as server 902 and/or a user device such as user devices 906, described below in connection with FIG. 9. For example, the blocks of process 600 can be executed by a user device (e.g., a mobile phone, a tablet computer, a laptop computer, a desktop computer, a wearable computer, a streaming media device, a smart television, a game console, a vehicle entertainment system, and/or any other suitable user device) that streams video content from a server. Note that, in some embodiments, the blocks of process 600 can be performed by an application for streaming and presenting video content (e.g., an application associated with a particular video content service, and/or any other suitable application) that is executing on the user device.

Process 600 can begin, in some embodiments, by receiving an indication that a user has accessed an account associated with media content creation or media content sharing at 602. For example, in some embodiments, a content creator can log into an analytics page and/or service associated with a channel that the content creator uses to upload their videos.

At 604, process 600 can continue, in some embodiments, by retrieving at least one video associated with the account and which has been identified (e.g., by process 100) as containing key moments and associated aggregated viewer reactions (e.g., the popular sentiment at the identified key moment). Process 600 can additionally retrieve, e.g., from a reactions database, the received reactions, key moment information, and associated information (e.g., selected graphical icons, reaction panel interface information, reaction type, reaction timestamp, reaction size, etc.). In some embodiments, process 600 can retrieve the received reactions, key moment information, and associated information for multiple videos.

Figure 7:
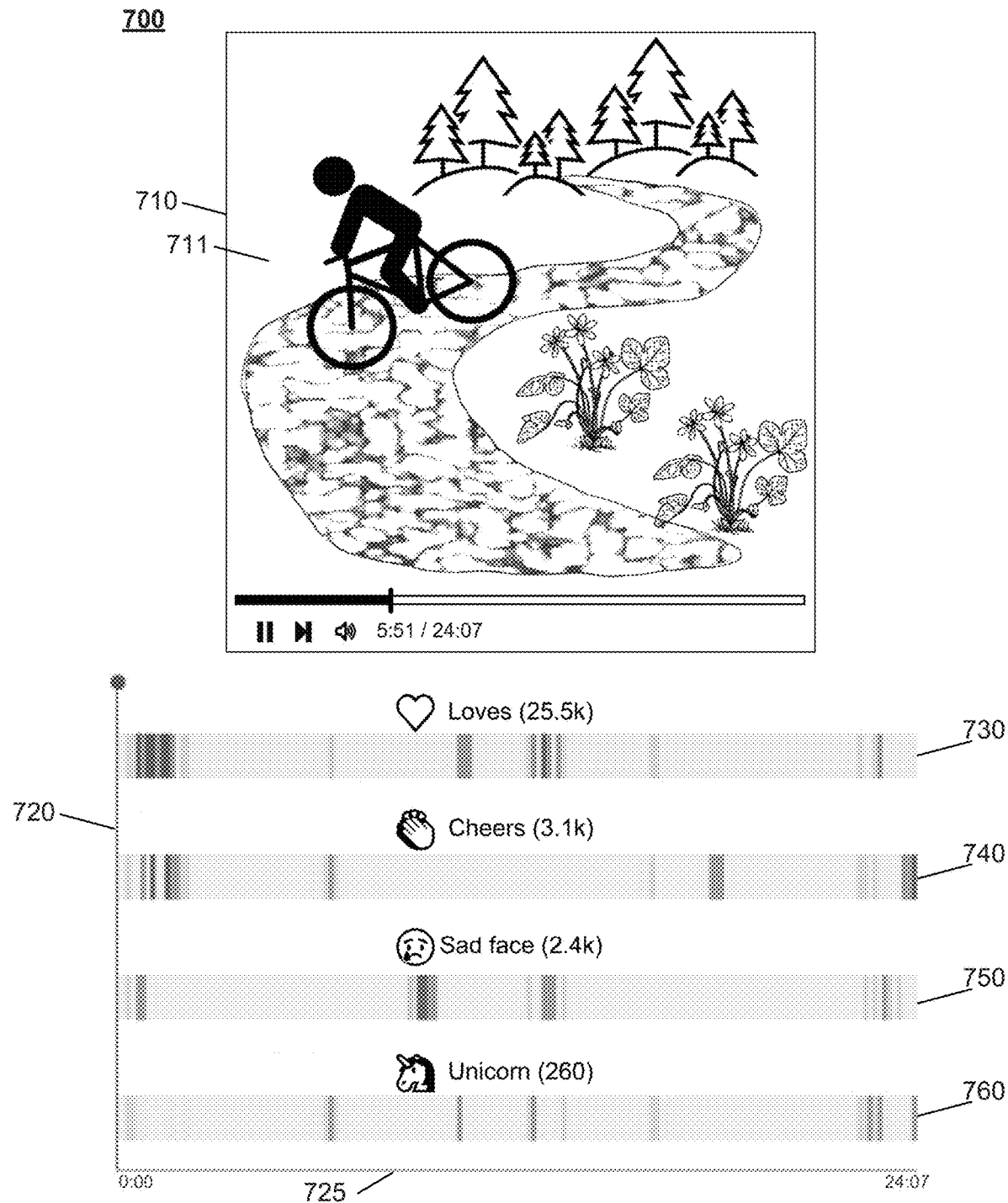
FIG. 7 shows an illustrative display screen for providing graphical representations of the received viewer reactions throughout a media content item, where each graphical representation can be associated with one of the received viewer reactions, in accordance with some embodiments of the disclosed subject matter.

At 606, process 600 can cause a graph to be presented that displays the distribution of received user reactions throughout the duration of the video(s) retrieved at 604. In some embodiments, at 606, process 600 can cause any other suitable visualization, graphic, spreadsheet, and/or analytical tool to display reaction data associated with videos retrieved at 604. As a particular example, FIG. 7 shows an illustrative example 700 in which a video display 710 containing video 711 and a reactions graph 720 with timeline 725 are shown. As shown in FIG. 7, reaction graph 720 can display a separate time series 730-760 for each reaction icon associated with video 711. As also shown in FIG. 7, time series 730 can include data for the "heart" reaction icon, titled "Loves." In some embodiments, time series 730 can include a count of the total heart reactions across the duration of video 711 (e.g., 25.5$k$ love reactions). In some embodiments, time series 730 can use any suitable visual identifier to indicate "heart" reactions along timeline 725. For example, as shown in FIG. 7, time series 730 can use color shading, with darker shades indicating more reactions at that point along timeline 725 and lighter shades indicating few or no reactions to the video at those time points. As shown, each of the time series in FIG. 7 can be sorted based on the number of received reactions, where time series 740 can be displayed beneath time series 730 as time series 740 has fewer total reactions than time series 730. These time series or other reaction data displays can allow a content creator to gain an understanding of how an audience feels about different moments within the media content item (e.g., what types of reactions were received throughout the media content item, what types of reactions were received at particular moments within the media content item, etc.) and gain an understanding of which moments within the media content item that the audience provided the most reactions or engagement (e.g., which portions of the media content item causes a greater number of user reactions, which portions of the media content item causes little to no user reaction, etc.).

In some embodiments, display 700 can include any additional features. For example, in some embodiments, time series 730-760 can include indications of automatically identified key moments, as discussed above in process 100.

Returning to FIG. 6, process 600 can continue at 608 when the content creator interacts with the displayed reaction data of 606 in some embodiments. For example, in some embodiments, the content creator can highlight, select, and/or use any other suitable tools to indicate the manual creation of a key moment. As a particular example, the video creator can navigate along any of time series 730-760 to select a start time and an end time and can designate the selected time window as corresponding to a key moment. In some embodiments, process 600 can add the manually created moment to any existing key moments. For example, in some embodiments, process 600 can add the time window, the reaction icon from the selected time series, and/or any other suitable information to the metadata of the video.

At 610, process 600 can continue when process 600 receives a request from a user device to view the video content item having the manually created key moment and/or the automatically identified key moments.

At 612, process 600 can cause a representation of the key moment to be displayed along with the video content item. The representation of the key moment can be displayed, for example, in a pinned comment area while also displaying the video on the user device. For example, FIG. 8 shows an illustrative example 800 of a display screen for presenting media content items with viewer reactions. As shown, display 800 can include video display area 810, comment panel 820, and key moment display 830. In some embodiments, video display area 810 can contain video 811. In some embodiments, comment panel 820 can contain user submitted comments sorted by popularity ("top comments"). Additionally, in some embodiments, comment panel 820 can include pinned comment 830. In some embodiments, pinned comment 830 can include a key moment identified by the content creator, for example as discussed at 608 of process 600. As shown in FIG. 8, pinned comment 830 can include an indication of the key moment by displaying the reaction icon 832 and the time window 834 associated with the key moment. In some embodiments, pinned comment 830 can include a message 836 from the creator. In some embodiments, pinned comment 830 can include any suitable graphics, text, hyperlinks, etc.

Figure 8A:
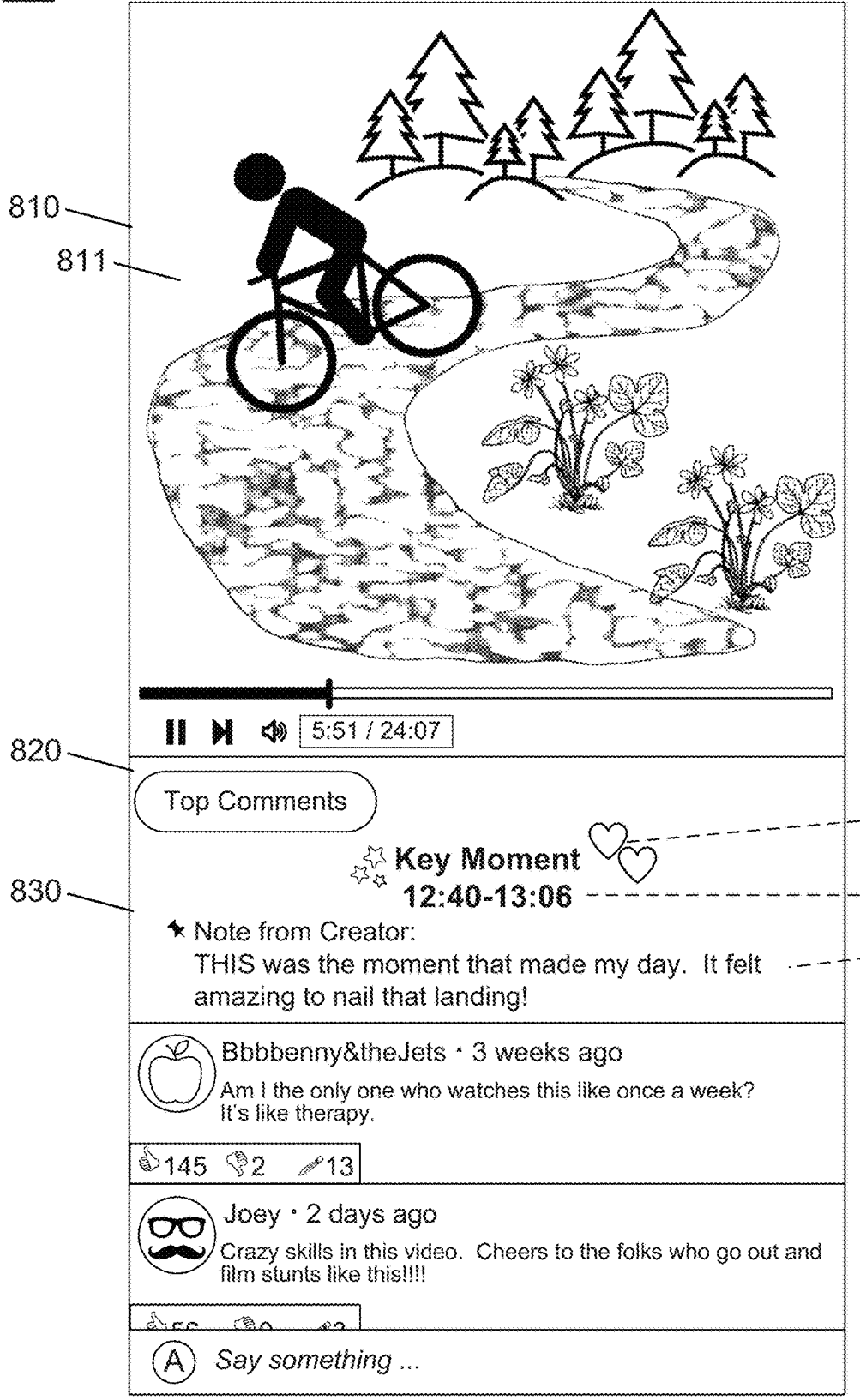
FIGS. 8A and 8B show illustrative display screens for providing creator responses to aggregated viewer reactions in accordance with some embodiments of the disclosed subject matter.
Figure 8B:
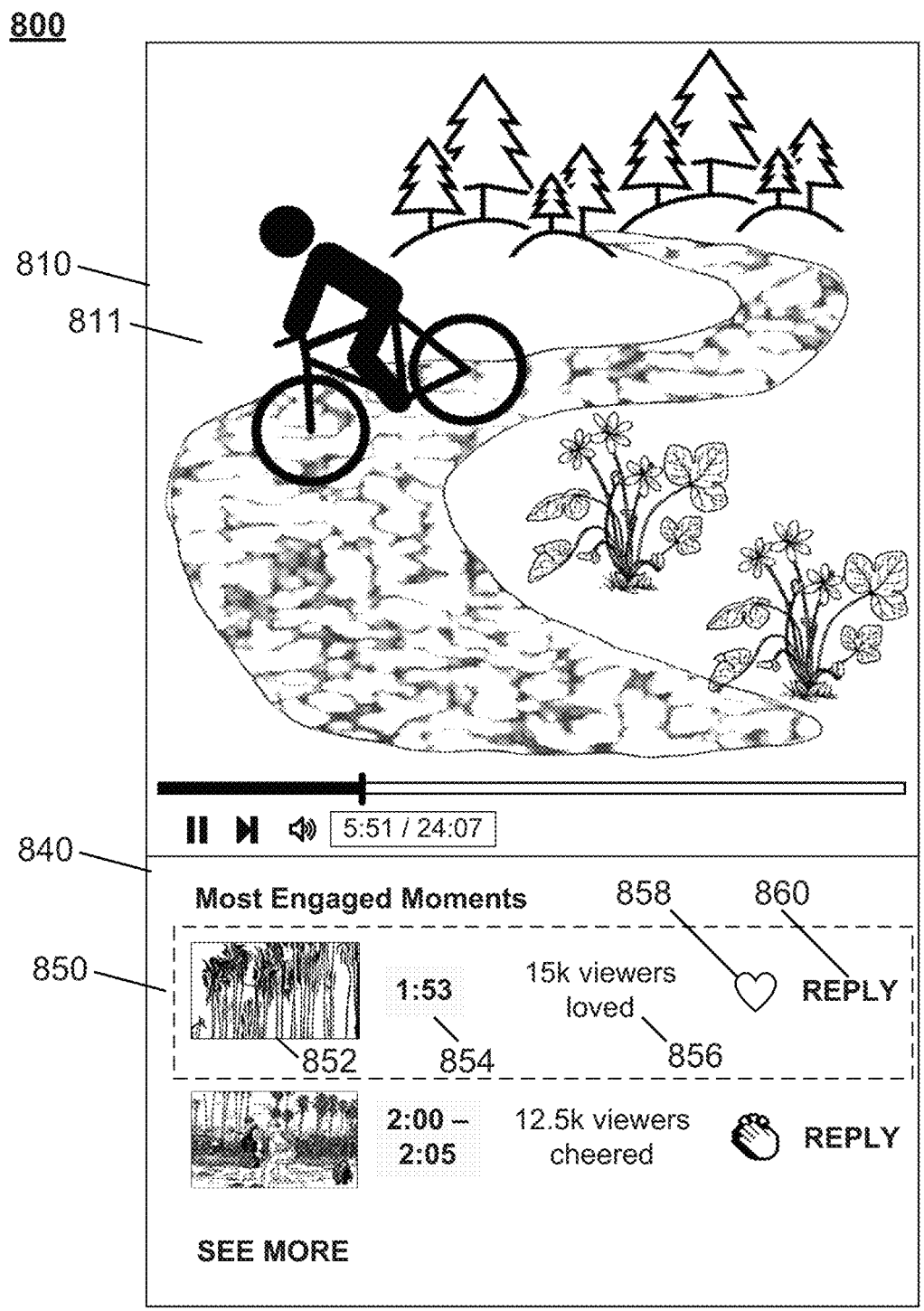

In some embodiments, FIG. 8B shows another example of representations of identified key moments that can be presented to the content creator. As shown, in addition to video display area 810 in which video 811 can be played back, moment region 840 can include a representation 850 of each identified key moment within the media content item. Each key moment representation 850 can include a thumbnail image that can be extracted from the media content item at timestamp or time window 854. In some embodiments, timestamp 854 can be selectable that, when selected by the content creator, can cause video 811 to be navigated to that particular time in the video. Additional information relating to the aggregated viewer reaction can be presented in representation 850, such as the number of viewers 856 that provided that particular reaction at that key moment and the graphical icon 858 that was most selected by viewers at that key moment.

In some embodiments, the content creator can be provided with an opportunity to respond to the popular viewer reaction or sentiment at an identified key moment. For example, as shown in FIG. 8B, a response button 860 can be presented in representation 850. In continuing this example, in response to selecting response button 860, the content creator can be presented with an interface for inputting a response to the popular viewer reaction or sentiment at an identified key moment. In response to receiving the response from the content creator, the response can be presented to viewers of the media content item. For example, as shown in FIG. 8A, the response can be presented within comment panel 820 as a message 836 from the content creator. In another example, as shown in FIG. 2, where moment 226 can include the representative graphical icon indicating the popular reaction or sentiment selected by viewers of the video content, a timestamp corresponding with the moment within the video (e.g., a time position of 1:05 within the video), and an indication of the size of the reaction (e.g., 2,000 viewers provided the reaction with the representative graphical icon), message 836 or any other suitable response to the audience reaction at the key moment can be presented adjacent to moment 226 in timed comments pane 220.

In some embodiments, the representations of key moments identified in FIG. 8B can be organized by the total number of received reactions at that moment or the total number of a particular received reaction at that moment. As such, response button 860 can provide the content creator with the opportunity to respond to the moments having the greatest reaction (e.g., a mostly loved moment).

Figure 9:
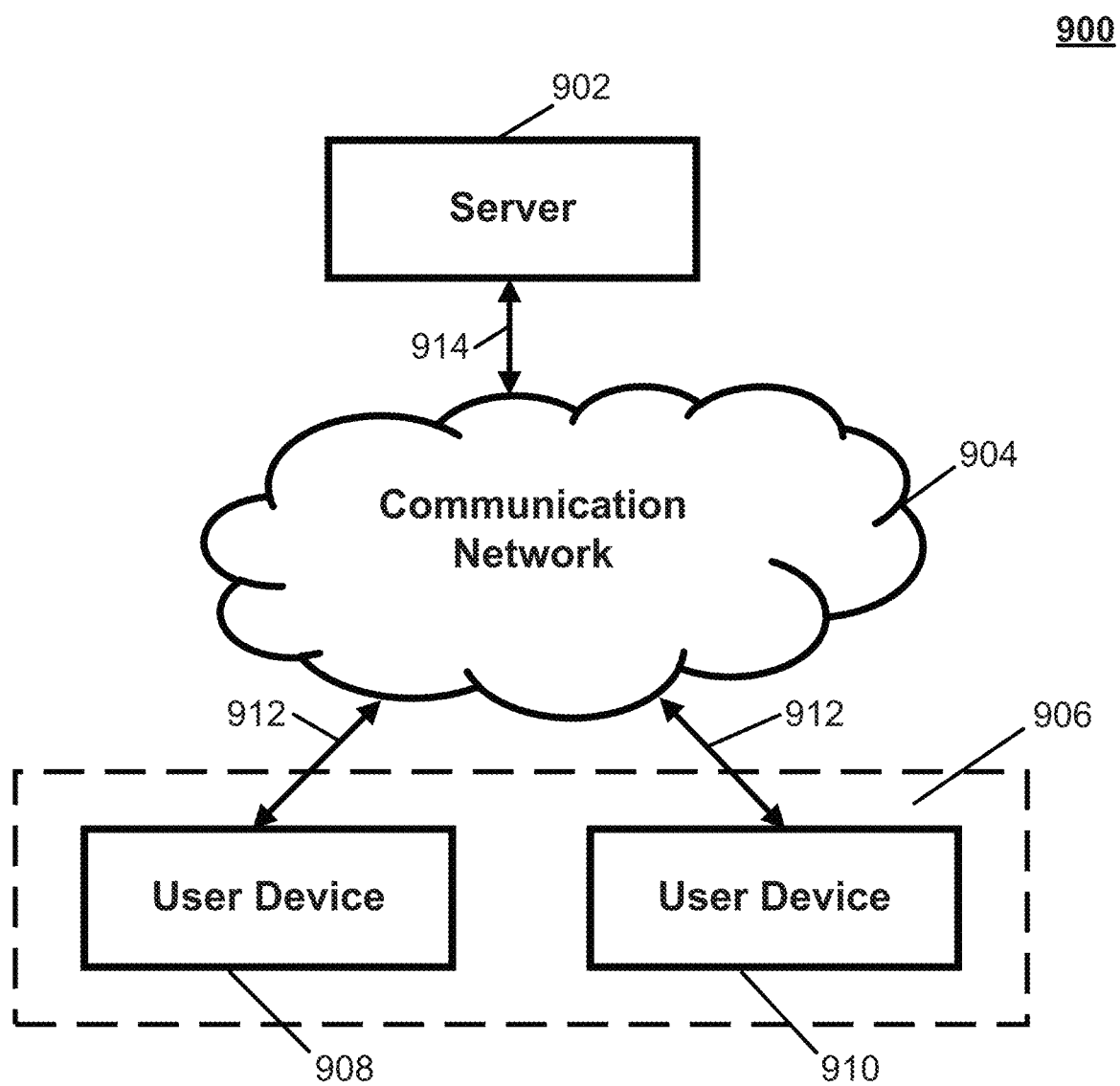
FIG. 9 shows an example block diagram of a system that can be used to implement mechanisms described herein for presenting media content items with viewer reactions in accordance with some embodiments of the disclosed subject matter.
Figure 10:
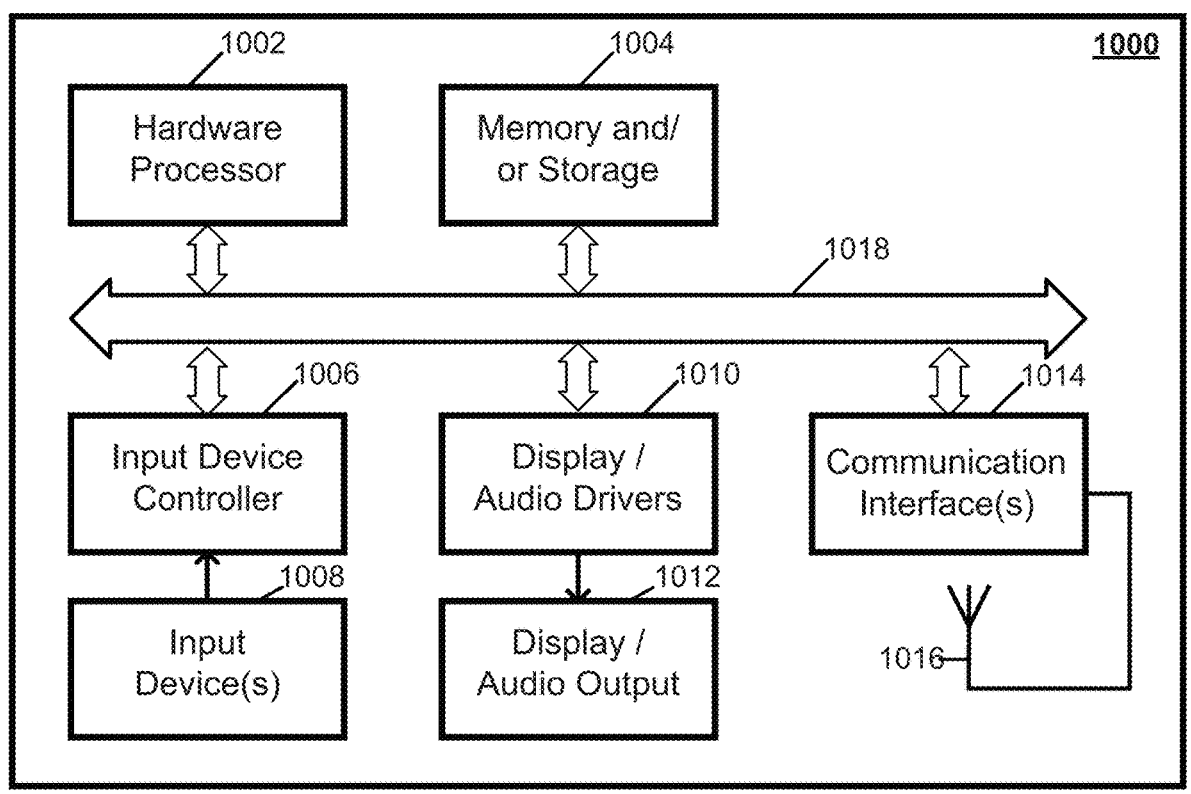
FIG. 10 shows an example block diagram of hardware that can be used in a server and/or a user device of FIG. 9 in accordance with some embodiments of the disclosed subject matter.

Turning to FIG. 9, an example 900 of hardware for identifying key moments within a media content item based on aggregated timed reactions, presenting aggregated timed reactions in synchronization with the media content item being presented, and generating reaction interfaces for receiving user-selected graphical icons that represent a reaction to a moment within the media content item in accordance with some embodiments is shown. As illustrated, hardware 900 can include a server 902, a communication network 904, and/or one or more user devices 906, such as user devices 908 and 910.

Server 902 can be any suitable server(s) for storing information, data, programs, media content, and/or any other suitable content. In some embodiments, server 902 can perform any suitable function(s).

Communication network 904 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 906 can be connected by one or more communications links (e.g., communications links 912) to communication network 904 that can be linked via one or more communications links (e.g., communications links 914) to server 902. The communications links can be any communications links suitable for communicating data among user devices 906 and server 902 such as network links, dial-up links, wireless links, hard-wired links, any other suitable communications links, or any suitable combination of such links.

User devices 906 can include any one or more user devices suitable for use with process 100. In some embodiments, user device 906 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 902 is illustrated as one device, the functions performed by server 902 can be performed using any suitable number of devices in some embodiments. For example, in some embodiments, multiple devices can be used to implement the functions performed by server 902.

Although two user devices 908 and 910 are shown in FIG. 9 to avoid overcomplicating the figure, any suitable number of user devices, (including only one user device) and/or any suitable types of user devices, can be used in some embodiments.

Server 902 and user devices 906 can be implemented using any suitable hardware in some embodiments. For example, in some embodiments, devices 902 and 906 can be implemented using any suitable general-purpose computer or special-purpose computer and can include any suitable hardware. For example, as illustrated in example hardware 1000 of FIG. 10, such hardware can include hardware processor 1002, memory and/or storage 1004, an input device controller 1006, an input device 1008, display/audio drivers 1010, display and audio output circuitry 1012, communication interface(s) 1004, an antenna 1016, and a bus 1018.

Hardware processor 1002 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 1002 can be controlled by a computer program stored in memory and/or storage 1004. For example, in some embodiments, the computer program can cause hardware processor 1002 to perform functions described herein.

Memory and/or storage 1004 can be any suitable memory and/or storage for storing programs, data, documents, and/or any other suitable information in some embodiments. For example, memory and/or storage 1004 can include random access memory, read-only memory, flash memory, hard disk storage, optical media, and/or any other suitable memory.

Input device controller 1006 can be any suitable circuitry for controlling and receiving input from one or more input devices 1008 in some embodiments. For example, input device controller 1006 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 1010 can be any suitable circuitry for controlling and driving output to one or more display/audio output devices 1012 in some embodiments. For example, display/audio drivers 1010 can be circuitry for driving a touchscreen, a flat-panel display, a cathode ray tube display, a projector, a speaker or speakers, and/or any other suitable display and/or presentation devices.

Communication interface(s) 1014 can be any suitable circuitry for interfacing with one or more communication networks, such as network 904 as shown in FIG. 9. For example, interface(s) 1014 can include network interface card circuitry, wireless communication circuitry, and/or any other suitable type of communication network circuitry.

Antenna 1016 can be any suitable one or more antennas for wirelessly communicating with a communication network (e.g., communication network 904) in some embodiments. In some embodiments, antenna 1016 can be omitted.

Bus 1018 can be any suitable mechanism for communicating between two or more components 1002, 1004, 1006, 1010, and 1014 in some embodiments.

Any other suitable components can be included in hardware 1000 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of processes 100, 300, and 600 can be executed or performed in any order or sequence not limited to the order and sequence shown in and described in connection with FIGS. 1, 3, and 6. Also, some of the above blocks of processes 100, 300, and 600 can be executed or performed substantially simultaneously where appropriate or in parallel to reduce latency and processing times. Additionally or alternatively, some of the above described blocks of processes 100, 300, and 600 can be omitted.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for presenting media content items with viewer reactions, the method comprising:

retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions;

grouping the plurality of reactions based on the reaction timestamp and based on the selected graphical icon;

determining whether the media content item is eligible for identification of key moments;

responsive to determining the media content item is eligible for the identification of key moments, identifying a plurality of key moments within the media content item based on the grouping of the plurality of reactions, wherein each of the plurality of key moments is associated with a representative graphical icon that corresponds to an aggregated viewer reaction;

receiving a request from a user device to present the media content item; and causing the media content item to be presented in a video window while concurrently presenting the aggregated viewer reaction when a current playback position of the media content item corresponds to a time window associated with each of the plurality of key moments.

2. The method of claim 1, wherein the plurality of reactions associated with the media content item are retrieved from a reactions database in response to determining that a number of the plurality of reactions is greater than a threshold value.

3. The method of claim 1, further comprising transmitting a query to a reactions database that requests a count of received reactions for the media content item from a given timestamp, wherein the plurality of reactions associated with the media content item are retrieved based on the count included in a response to the query.

4. The method of claim 1, wherein determining whether the media content item is eligible for identifying the plurality of key moments occurs prior to retrieving the plurality of reactions associated with the media content item.

5. The method of claim 1, wherein the plurality of key moments within the media content item are identified by:
generating a histogram of each received reaction over time, wherein each reaction is placed within a bucket of the histogram; and
detecting an expanding mound in the generated histogram as one of the plurality of key moments in the media content item.

6. The method of claim 5, wherein a first expanding mound in the generated histogram is associated with a first time interval and a second expanding mound in the generated histogram is associated with a second time interval, and wherein the first expanding mount is combined with the second expanding mount in response to the first time interval and the second time interval being separated by less than a threshold time.

7. The method of claim 1, wherein grouping the plurality of reactions further comprises removing a subset of reactions associated with a first timestamp from the plurality of reactions in response to determining that a number of reactions in the subset of reactions is less than a threshold value.

8. The method of claim 1, wherein a key moment from the plurality of key moments is identified in response to determining that a number of reactions associated with the key moment is greater than a threshold value and wherein the representative graphical icon associated with the key moment corresponds with the graphical icon that was most frequently selected by viewers of the media content item.

9. The method of claim 1, further comprising causing a reaction panel interface to be presented during the presentation of the media content item in the video window, wherein the reaction panel interface includes a plurality of selectable graphical icons that each correspond to one of the plurality of reactions.

10. The method of claim 9, wherein, in response to receiving a user selection of the graphical icon from the plurality of selectable graphical icons in the reaction panel interface, the graphical icon is presented above a playhead in a progress bar of the video window.

11. The method of claim 10, further comprising determining whether the graphical icon that was received at a first time matches the representative graphical icon associated with a moment at the first time, wherein the graphical icon that is presented above the playhead in the progress bar of the video window is enhanced based on the determination.

12. The method of claim 9, wherein the reaction panel interface has a collapsed state that includes a single graphical icon.

13. The method of claim 12, wherein the reaction panel interface transitions from the collapsed state to an expanded state in response to receiving a user selection of the single graphical icon.

14. The method of claim 12, wherein the single graphical icon transitions between a first representative graphical icon to a second representative graphical icon in response to the playback position of the media content item reaching each of the plurality of key moments, wherein the first representative graphical icon is associated with a first key moment and the second representative graphical icon is associated with a second key moment.

15. The method of claim 1, wherein the aggregate viewer reaction is presented concurrently with the media content item by presenting a graphical representation of the aggregate viewer reaction above a playhead in a progress bar of the video window.

16. The method of claim 15, wherein the graphical representation is an animation that includes multiple graphical icons corresponding to the aggregate viewer reaction and that shows the multiple graphical icons flowing from the playhead in the progress bar of the video window and into the video window.

17. The method of claim 15, wherein the graphical representation is an animation that indicates the aggregate viewer reaction and indicates an intensity of the aggregate viewer reaction, wherein the intensity is based on a number of received reactions at one of the plurality of key moments.

18. The method of claim 15, wherein the graphical representation ceases from being presented in response to determining that the current playback position of the media content item does not correspond to the time window associated with one of the plurality of key moments.

19. The method of claim 9, wherein the reaction panel interface has an expanded state that includes a plurality of selectable graphical icons that each correspond to one of the plurality of reactions and wherein the concurrent presentation of the media content item in the video window with the aggregated viewer reaction is activated in response to the reaction panel interface being in the expanded state.

20. A system for presenting media content items with viewer reactions, the system comprising:
a hardware processor that is configured to:
retrieve a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions;
group the plurality of reactions based on the reaction timestamp and based on the selected graphical icon;
determine whether the media content item is eligible for identification of key moments;
responsive to determining the media content item is eligible for the identification of key moments, identify a plurality of key moments within the media content item based on the grouping of the plurality of reactions, wherein each of the plurality of key moments is associated with a representative graphical icon that corresponds to an aggregated viewer reaction;

receive a request from a user device to present the media content item; and cause the media content item to be presented in a video window while concurrently presenting the aggregated viewer reaction when a current playback position of the media content item corresponds to a time window associated with each of the plurality of key moments.

21. A non-transitory computer-readable medium containing computer executable instructions that, when executed by a processor, cause the processor to execute a method for presenting media content items with viewer reactions, the method comprising:

retrieving a plurality of reactions associated with a media content item, wherein each reaction in the plurality of reactions comprises a reaction timestamp that corresponds to a time within the media content item at which a reaction was received and a graphical icon that was selected from a plurality of graphical icons that each correspond to one of the plurality of reactions;

grouping the plurality of reactions based on the reaction timestamp and based on the selected graphical icon;

determining whether the media content item is eligible for identification of key moments;

responsive to determining the media content item is eligible for the identification of key moments, identifying a plurality of key moments within the media content item based on the grouping of the plurality of reactions, wherein each of the plurality of key moments is associated with a representative graphical icon that corresponds to an aggregated viewer reaction;

receiving a request from a user device to present the media content item; and causing the media content item to be presented in a video window while concurrently presenting the aggregated viewer reaction when a current playback position of the media content item corresponds to a time window associated with each of the plurality of key moments.

* * * * *